US010116908B2

(12) United States Patent
Mochinaga et al.

(10) Patent No.: US 10,116,908 B2
(45) Date of Patent: Oct. 30, 2018

(54) PLAYBACK METHOD, PLAYBACK DEVICE, AND NON-TRANSITORY COMPUTER-READABLE RECORDING MEDIUM STORING PROGRAM

(71) Applicant: Panasonic Intellectual Property Corporation of America, Torrance, CA (US)

(72) Inventors: Kazuhiro Mochinaga, Osaka (JP); Hiroshi Yahata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/486,391

(22) Filed: Apr. 13, 2017

(65) Prior Publication Data
US 2017/0223328 A1 Aug. 3, 2017

Related U.S. Application Data

(63) Continuation of application No. PCT/JP2015/005224, filed on Oct. 16, 2015.
(Continued)

(30) Foreign Application Priority Data

Aug. 27, 2015 (JP) ................................ 2015-168344

(51) Int. Cl.
*H04N 5/775* (2006.01)
*H04N 9/80* (2006.01)
(Continued)

(52) U.S. Cl.
CPC ......... *H04N 9/7925* (2013.01); *G11B 27/329* (2013.01); *H04N 5/85* (2013.01);
(Continued)

(58) Field of Classification Search
USPC ................................................. 386/248, 230
See application file for complete search history.

(56) References Cited

U.S. PATENT DOCUMENTS

| 6,088,506 | A | 7/2000 | Yoshio et al. |
| 2004/0033061 | A1* | 2/2004 | Hughes, Jr. .......... H04N 9/7921 386/336 |

(Continued)

FOREIGN PATENT DOCUMENTS

| EP | 3013040 A1 | 4/2016 |
| EP | 3013041 A1 | 4/2016 |

(Continued)

OTHER PUBLICATIONS

International Search Report of PCT application No. PCT/JP2015/005224 dated Dec. 1, 2015.

(Continued)

*Primary Examiner* — Nigar Chowdhury
(74) *Attorney, Agent, or Firm* — Greenblum & Bernstein, P.L.C.

(57) ABSTRACT

A playback device plays video streams recorded in a recording medium, in which are one or more video streams including at least one of an HDR stream whose dynamic range of luminance of video corresponds to a high dynamic range (HDR), and an SDR stream whose dynamic range of luminance of video corresponds to a standard dynamic range (SDR) narrower than HDR, and identification information indicating whether the HDR stream is included in the one or more video streams. A playback method of the playback device includes: reading the identification information from the recording medium; acquiring playback capability information indicating whether the playback device can play the HDR stream, and display capability information indicating whether a connected display device can display the HDR video; and deciding on a video stream from the one or more (Continued)

video streams, according to the identification information, the playback capability information, and the display capability information.

8 Claims, 30 Drawing Sheets

Related U.S. Application Data

(60) Provisional application No. 62/074,817, filed on Nov. 4, 2014.

(51) Int. Cl.
    *H04N 9/79*    (2006.01)
    *H04N 9/87*    (2006.01)
    *H04N 5/85*    (2006.01)
    *G11B 27/32*   (2006.01)

(52) U.S. Cl.
    CPC ....... *H04N 9/87* (2013.01); *G11B 2220/2541* (2013.01); *G11B 2220/2562* (2013.01)

(56) References Cited

U.S. PATENT DOCUMENTS

| | | |
|---|---|---|
| 2011/0164121 A1 | 7/2011 | Ikeda et al. |
| 2011/0194618 A1* | 8/2011 | Gish .................. G06T 5/50 375/240.25 |
| 2014/0125696 A1 | 5/2014 | Newton et al. |
| 2014/0210847 A1* | 7/2014 | Knibbeler .............. G09G 5/006 345/589 |
| 2015/0042890 A1* | 2/2015 | Messmer ................. H04N 5/20 348/725 |
| 2015/0103919 A1* | 4/2015 | Hattori ................. H04N 19/124 375/240.25 |

FOREIGN PATENT DOCUMENTS

| | | |
|---|---|---|
| JP | 9-282848 | 10/1997 |
| JP | 2011-155657 | 8/2011 |
| NO | 2012/172460 | 12/2012 |
| WO | 2014/203746 A1 | 12/2014 |
| WO | 2014/203747 A1 | 12/2014 |

OTHER PUBLICATIONS

Extended European Search Report, dated Feb. 7, 2018 from the European Patent Office (EPO), for the related European Patent Application No. 15856329.6.

* cited by examiner

FIG. 4

| |
|---|
| VIDEO STREAM (PID=0x1011   MAIN VIDEO) |
| AUDIO STREAM (PID=0x1100) |
| AUDIO STREAM (PID=0x1101) |
| PRESENTATION GRAPHICS STREAM (PID=0x1200) |
| PRESENTATION GRAPHICS STREAM (PID=0x1201) |
| INTERACTIVE GRAPHICS STREAM (PID=0x1400) |
| VIDEO STREAM (PID=0x1B00   SUB-VIDEO) |
| VIDEO STREAM (PID=0x1B01   SUB-VIDEO) |

FIG. 16

| 0 | Language code | 11 | Player audio mixing mode for Karaoke | 22 | Secondary Audio Stream number |
|---|---|---|---|---|---|
| 1 | Audio stream number | 12 | Country code for parental management | 23 | Player status |
| 2 | Subtitle stream number | 13 | Parental level | 24 | 3D-Capability |
| 3 | Angle number | 14 | Player configuration for Video | 25 | HDR-Capability |
| 4 | Title number | 15 | Player configuration for Audio | 26 | HDR Display Capability |
| 5 | Chapter number | 16 | Language code for AST | 27 | HDR Output Mode |
| 6 | Program number | 17 | Language code ext. for AST | 28 | HDR Output Preference |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | Secondary Video Stream number | 32 | reserved |

FIG. 20

| video_combination_type | VIDEO PRESENCE FLAG | | | | |
|---|---|---|---|---|---|
| | is_HDR1 | is_HDR2 | is_HDR3 | is_SDR1 | is_SDR2 |
| 1 | 1 | 0 | 0 | 0 | 0 |
| 2 | 1 | 1 | 0 | 0 | 0 |
| 3 | 1 | 0 | 1 | 0 | 0 |
| 4 | 1 | 1 | 1 | 0 | 0 |
| 5 | 1 | 0 | 0 | 1 | 0 |
| 6 | 1 | 1 | 0 | 1 | 0 |
| 7 | 1 | 0 | 1 | 1 | 0 |
| 8 | 1 | 1 | 1 | 1 | 0 |
| 9 | 1 | 0 | 0 | 0 | 1 |
| 10 | 1 | 1 | 0 | 0 | 1 |
| 11 | 1 | 0 | 1 | 0 | 1 |
| 12 | 1 | 1 | 1 | 0 | 1 |
| 13 | 0 | 0 | 0 | 1 | 0 |
| 14 | 0 | 0 | 0 | 0 | 1 |

FIG. 21A

```
[PLAYLIST FILE]
<PLAYLIST INFORMATION>
  ·video_combination_type =1 //TYPE OF COMBINATION OF MAIN-VIDEO VIDEO
  ·is_HDR1 =1 // HDR VIDEO 1 (REQUIRED) EXISTS
  ·is_HDR2 =0 // HDR VIDEO 2 (FIRST OPTION) DOES NOT EXIST
  ·is_HDR3 =0 // HDR VIDEO 3 (SECOND OPTION) DOES NOT EXIST
  ·is_SDR1 =0 // SDR VIDEO 1 (HDR-COMPATIBLE) DOES NOT EXIST
  ·is_SDR2 =0 // SDR VIDEO 2 (HDR-INCOMPATIBLE) DOES NOT EXIST
</PLAYLIST INFORMATION>
     :
<STREAM SELECTION TABLE>
    <STREAM IDENTIFICATION=MAIN VIDEO>
        <STREAM ATTRIBUTES>
            is_HDR =1      //MAIN VIDEO IS HDR
        </STREAM ATTRIBUTES>
    </STREAM IDENTIFICATION >
       :
</STREAM SELECTION TABLE>
     :
```

FIG. 21B

```
[PLAYLIST FILE]
<PLAYLIST INFORMATION>
  ·video_combination_type =13 //TYPE OF COMBINATION OF MAIN-VIDEO VIDEO
  ·is_HDR1 =0 // HDR VIDEO 1 (REQUIRED) DOES NOT EXIST
  ·is_HDR2 =0 // HDR VIDEO 2 (FIRST OPTION) DOES NOT EXIST
  ·is_HDR3 =0 // HDR VIDEO 3 (SECOND OPTION) DOES NOT EXIST
  ·is_SDR1 =1 // SDR VIDEO 1 (HDR-COMPATIBLE) EXISTS
  ·is_SDR2 =0 // SDR VIDEO 2 (HDR-INCOMPATIBLE) DOES NOT EXIST
</PLAYLIST INFORMATION>
                    :
<STREAM SELECTION TABLE>
    <STREAM IDENTIFICATION=MAIN VIDEO>
          <STREAM ATTRIBUTES>
                is_HDR =0  //MAIN VIDEO IS SDR
          </STREAM ATTRIBUTES>
    </STREAM IDENTIFICATION>
                    :
</STREAM SELECTION TABLE>
                    :
```

FIG. 21C

```
[PLAYLIST FILE]
<PLAYLIST INFORMATION>
  ·video_combination_type =14 //TYPE OF COMBINATION OF MAIN-VIDEO VIDEO
  ·is_HDR1 =0 // HDR VIDEO 1 (REQUIRED) DOES NOT EXIST
  ·is_HDR2 =0 // HDR VIDEO 2 (FIRST OPTION) DOES NOT EXIST
  ·is_HDR3 =0 // HDR VIDEO 3 (SECOND OPTION) DOES NOT EXIST
  ·is_SDR1 =0 // SDR VIDEO 1 (HDR-COMPATIBLE) DOES NOT EXIST
  ·is_SDR2 =1 // SDR VIDEO 2 (HDR-INCOMPATIBLE) EXISTS
</PLAYLIST INFORMATION>
                    :
<STREAM SELECTION TABLE>
    <STREAM IDENTIFICATION=MAIN VIDEO>
          <STREAM ATTRIBUTES>
                is_HDR =0 //MAIN VIDEO IS SDR
          </STREAM ATTRIBUTES>
    </STREAM IDENTIFICATION >
                    :
</STREAM SELECTION TABLE>
                    :
```

FIG. 21D

```
[PLAYLIST FILE]
        :
<PLAYLIST INFORMATION>
   ·video_combination_type =2 //TYPE OF COMBINATION OF MAIN-VIDEO VIDEO
   ·is_HDR1 =1 // HDR VIDEO 1 (REQUIRED) EXISTS
   ·is_HDR2 =1 // HDR VIDEO 2 (FIRST OPTION) EXISTS
   ·is_HDR3 =0 // HDR VIDEO 3 (SECOND OPTION) DOES NOT EXIST
   ·is_SDR1 =0 // SDR VIDEO 1 (HDR-COMPATIBLE) DOES NOT EXIST
   ·is_SDR2 =0 // SDR VIDEO 2 (HDR-INCOMPATIBLE) DOES NOT EXIST
</PLAYLIST INFORMATION>
        :
<STREAM SELECTION TABLE>
    <STREAM IDENTIFICATION = MAIN VIDEO>
        <STREAM ATTRIBUTES>
             is_HDR =1   //MAIN VIDEO IS HDR
        </STREAM ATTRIBUTES>
    </STREAM IDENTIFICATION>
        :
</STREAM SELECTION TABLE>
        :
<EXTENSION METADATA>
    Type =HDR2 //METADATA FOR HDR VIDEO 2
    (HDR METADATA INFORMATION)
</EXTENSION METADATA>
        :
```

FIG. 21E

```
[PLAYLIST FILE]
        :
<PLAYLIST INFORMATION>
  ·video_combination_type =3 //TYPE OF COMBINATION OF MAIN-VIDEO VIDEO
  ·is_HDR1 =1 // HDR VIDEO 1 (REQUIRED) EXISTS
  ·is_HDR2 =0 // HDR VIDEO 2 (FIRST OPTION) DOES NOT EXIST
  ·is_HDR3 =1 // HDR VIDEO 3 (SECOND OPTION) EXISTS
  ·is_SDR1 =0 // SDR VIDEO 1 (HDR-COMPATIBLE) DOES NOT EXIST
  ·is_SDR2 =0 // SDR VIDEO 2 (HDR-INCOMPATIBLE) DOES NOT EXIST
</PLAYLIST INFORMATION>
        :
<STREAM SELECTION TABLE>
    <STREAM IDENTIFICATION = MAIN VIDEO>
          <STREAM ATTRIBUTES>
              is_HDR =1   //MAIN VIDEO IS HDR
          </STREAM ATTRIBUTES>
    </STREAM IDENTIFICATION>
        :
</STREAM SELECTION TABLE>
        :
<SUB-PATH>
    Type =HDR3   //SUB-PATH FOR HDR VIDEO 3
    (HDR EXTENSION STREAM INFORMATION)
</SUB-PATH>
        :
```

FIG. 21F

```
[PLAYLIST FILE]
        :
<PLAYLIST INFORMATION>
  ·video_combination_type =5 //TYPE OF COMBINATION OF MAIN-VIDEO VIDEO
  ·is_HDR1 =1 // HDR VIDEO 1 (REQUIRED) EXISTS
  ·is_HDR2 =0 // HDR VIDEO 2 (FIRST OPTION) DOES NOT EXIST
  ·is_HDR3 =0 // HDR VIDEO 3 (SECOND OPTION) DOES NOT EXIST
  ·is_SDR1 =1 // SDR VIDEO 1 (HDR-COMPATIBLE) EXISTS
  ·is_SDR2 =0 // SDR VIDEO 2 (HDR-INCOMPATIBLE) DOES NOT EXIST
</PLAYLIST INFORMATION>
        :
<STREAM SELECTION TABLE>
    <STREAM IDENTIFICATION = MAIN VIDEO>
         <STREAM ATTRIBUTES>
              is_HDR =1   //MAIN VIDEO IS HDR
         </STREAM ATTRIBUTES>
    </STREAM IDENTIFICATION>
        :
</STREAM SELECTION TABLE>
        :
<ENHANCED STREAM SELECTION TABLE>
    <STREAM IDENTIFICATION = MAIN VIDEO 2 >
         <STREAM ATTRIBUTES>
              is_HDR =0   //MAIN VIDEO 2 IS SDR
         </STREAM ATTRIBUTES>
    </STREAM IDENTIFICATION>
        :
</ENHANCED STREAM SELECTION TABLE>
        :
```

FIG. 21G

```
[PLAYLIST FILE]
        :
<PLAYLIST INFORMATION>
  ·video_combination_type =6 //TYPE OF COMBINATION OF MAIN-VIDEO VIDEO
  ·is_HDR1 =1 // HDR VIDEO 1 (REQUIRED) EXISTS
  ·is_HDR2 =0 // HDR VIDEO 2 (FIRST OPTION) DOES NOT EXIST
  ·is_HDR3 =0 // HDR VIDEO 3 (SECOND OPTION) DOES NOT EXIST
  ·is_SDR1 =0 // SDR VIDEO 1 (HDR-COMPATIBLE) DOES NOT EXIST
  ·is_SDR2 =1 // SDR VIDEO 2 (HDR-INCOMPATIBLE) EXISTS
</PLAYLIST INFORMATION>
        :
<STREAM SELECTION TABLE>
    <STREAM IDENTIFICATION = MAIN VIDEO>
        <STREAM ATTRIBUTES>
            is_HDR =1   //MAIN VIDEO IS HDR
        </STREAM ATTRIBUTES>
    </STREAM IDENTIFICATION>
        :
</STREAM SELECTION TABLE>
        :
<ENHANCED STREAM SELECTION TABLE>
    <STREAM IDENTIFICATION = MAIN VIDEO 2>
        <STREAM ATTRIBUTES>
            is_HDR =0   //MAIN VIDEO 2 IS SDR
        </STREAM ATTRIBUTES>
    </STREAM IDENTIFICATION>
        :
</ENHANCED STREAM SELECTION TABLE>
        :
```

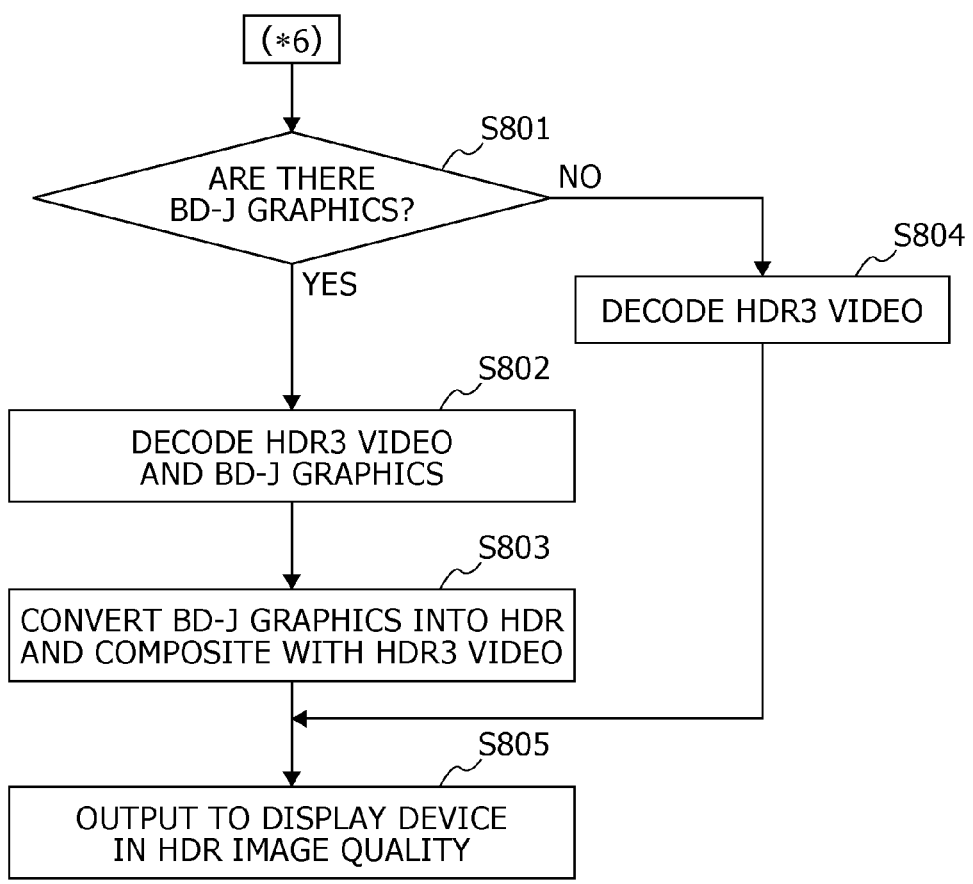

PLAYBACK METHOD, PLAYBACK DEVICE, AND NON-TRANSITORY COMPUTER-READABLE RECORDING MEDIUM STORING PROGRAM

BACKGROUND

1. Technical Field

The present invention relates to a playback method of video data including high-dynamic range (HDR) video recorded on a recording medium, a playback device, and a non-transitory computer-readable recording medium storing a program.

2. Description of the Related Art

Technology relating to Digital Versatile Discs (DVD) has conventionally been disclosed (e.g., Japanese Unexamined Patent Application Publication No. 9-282848).

SUMMARY

In one general aspect, the techniques disclosed here feature a playback method of a playback device that plays video streams recorded in a recording medium, in which are recorded one or more video streams including at least one of an HDR stream of which a dynamic range of luminance of video corresponds to a high dynamic range (HDR), and an SDR stream of which a dynamic range of luminance of video corresponds to a standard dynamic range (SDR) that is narrower than HDR, and identification information indicating whether or not the HDR stream is included in the one or more video streams. The playback method includes: reading the identification information from the recording medium; acquiring playback capability information indicating whether or not the playback device can play the HDR stream, and display capability information indicating whether or not a display device connected to the playback device can display the HDR video; deciding a video stream for playback out of the one or more video streams, in accordance with the identification information that has been read out, and the acquired playback capability information and the acquired display capability information; playing the decided video stream; and outputting playback signals obtained by the playing on the display device.

According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating the configuration of an AV clip;

FIG. 16 is a diagram illustrating a list of system parameters for the playback device;

FIG. 20 is a diagram illustrating combination patterns of main video within a playlist;

FIG. 21A is a diagram illustrating a data configuration example in a case where only a main video stream of HDR video exists;

FIG. 21B is a diagram illustrating a data configuration example in a case where only a main video stream, that is HDR-compatible SDR, exists in the playlist;

FIG. 21C is a diagram illustrating a data configuration example in a case where only a main video stream, that is HDR-incompatible SDR, exists in the playlist;

FIG. 21D is a diagram illustrating a data configuration example in a case where a required HDR main video stream and first option HDR main video stream exist in the playlist;

FIG. 21E is a diagram illustrating a data configuration example in a case where a required HDR main video stream and second option HDR main video stream exist in the playlist;

FIG. 21F is a diagram illustrating a data configuration example in a case where a required HDR main video stream and HDR-compatible SDR main video stream exist in the playlist;

FIG. 21G is a diagram illustrating a data configuration example in a case where a required HDR main video stream and HDR-incompatible SDR main video stream exist in the playlist;

FIG. 29 is a flowchart illustrating an example of an output method of outputting video including HDR3 video to a display device, in a case where HDR3 video has been selected.

DETAILED DESCRIPTION

Figure 1:
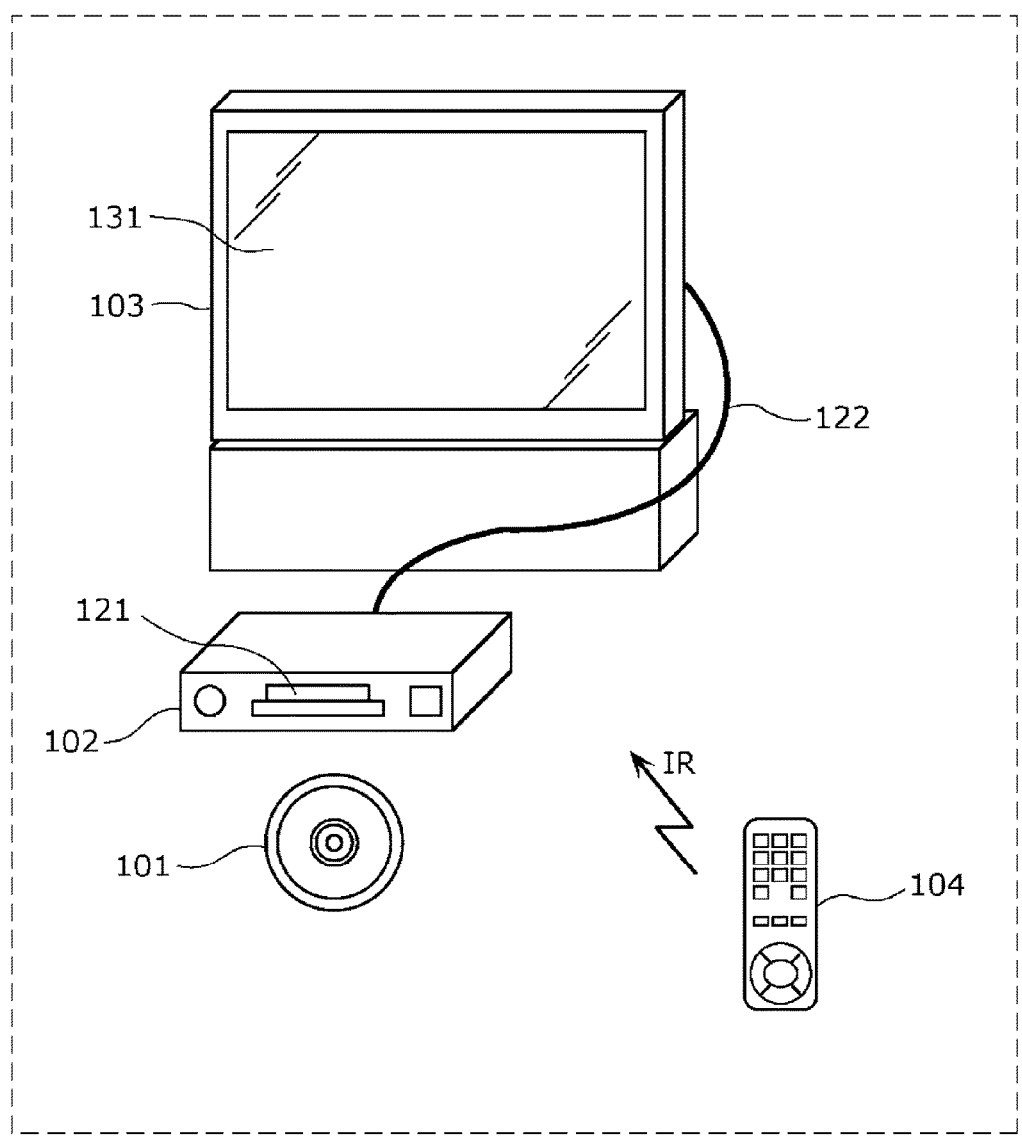
FIG. 1 is a schematic diagram of a home theater system using a playback device according to an embodiment of the present disclosure.

Underlying Knowledge Forming Basis of the Present Disclosure

Further improvement was needed with the above-described Japanese Unexamined Patent Application Publication No. 9-282848). The present Inventors found that the following problem occurs relating to the recording medium such as DVDs described in the "Background Art" section.

Optical discs such as DVDs and Blu-ray (a registered trademark) Discs are in widespread use for distributing moving image contents such as movies and the like. Particularly, Blu-ray (registered trademark) Discs (BD) can handle high definition (HD) that is 1920×1080, whereas conventional DVD has been standard definition (SD), and thus can store video of higher image quality. Recent years have seen the advent of video contents having even higher resolution such as 4K (3840×2160) and 8K (7680×4320) that exceeds HD, as video contents (hereinafter referred to as "high-resolution video"), and home-use playback devices capable of playing 4K video are coming into commonplace use. In addition to the above-described high-resolution video, there is increased attention to high dynamic range (HDR) technology that improves contrast and color expression of video by employing a broader dynamic range of luminance of the video, as compared to conventional arrangements. There are accordingly video contents now that are compatible with the HDR technology, so hereinafter there is demand for recording high-resolution and high dynamic range video contents in recording media such as optical disks, and playback thereof.

Recorded in a BD is one or the other of a video stream compatible with standard dynamic range (SDR) that is the conventional format for the dynamic range of luminance of video (hereinafter referred to as "SDR stream"), and a video stream compatible with high dynamic range (HDR) that is a format where the dynamic range of SDR has been expanded (hereinafter referred to as "HDR stream"), or both. There also are multiple different formats for HDR streams. An HDR stream compatible with one of the multiple different formats, or multiple HDR streams compatible with each of the multiple different formats, is/are recorded in a BD.

On the other hand, there are playback devices that have HDR stream playback capabilities and those that do not, and there are display devices that have HDR video display capabilities and those that do not. There also may be playback devices that have playback capabilities for the multiple types of HDR streams corresponding to the multiple HDR formats, and there may be display devices that have display capabilities for the multiple types of HDR video corresponding to the multiple HDR formats.

The playback capabilities thus differ from one playback device to another, and the display capabilities differ from one display device to another, so which video stream corresponding to which dynamic range format to select, out of the multiple video streams recorded in the recording medium and play and display, differs depending on the combination of the playback device and display device to be connected to each other.

For example, in a case where the playback device has HDR stream playback capabilities, but the display device connected to this playback device does not have HDR video playback capabilities, there is a problem that the video contents of the HDR stream recorded in the recording medium cannot be displayed on the display device in the image quality corresponding to HDR. In light of the above studies, the Present Inventors studied the following improvement measures to solve the above problem.

A playback method according to an aspect of the present disclosure is a playback method of a playback device that plays video streams recorded in a recording medium, in which recording medium is recorded one or more video streams including at least one of an HDR stream of which a dynamic range of luminance of video corresponds to a high dynamic range (HDR), and an SDR stream of which a dynamic range of luminance of video corresponds to a standard dynamic range (SDR) that is narrower than HDR, and identification information indicating whether or not the HDR stream is included in the one or more video streams. The playback method includes: reading the identification information from the recording medium; acquiring playback capability information indicating whether or not the playback device can play the HDR stream, and display capability information indicating whether or not a display device connected to the playback device can display the HDR video; deciding a video stream for playback out of the one or more video streams, in accordance with the identification information that has been read out, and the playback capability information and display capability information that have been acquired; playing the decided video stream; and outputting playback signals obtained by the playback on the display device.

According to this, the video stream to play is decided in accordance with the three types of information, namely, identification information, playback capability information, and display capability information, so video of an appropriate video stream can be output to the display device.

Also, in the deciding, a video stream may be decided out of the one or more video streams to be the stream to be played, of which the identification information that has been read out indicates being included in the one or more video streams, and the acquired playback capability information indicates that playback can be performed, and the acquired display capability information indicates that display can be performed.

Accordingly, video of an appropriate video stream can be output to the display device.

Also, for example, in the deciding, in a case where there are two or more video streams that can be played at the playback device and that can be displayed at the display device, a video stream of the two or more video streams of which a predetermined priority is higher may be decided to be the stream to be played.

Accordingly, video of a more appropriate video stream can be output to the display device.

Also, for example, the identification information may further indicate whether or not the SDR stream is included in the one or more video streams. In the deciding, in a case where the identification information indicates that the one or more video streams includes the HDR stream and the SDR stream, if the playback capability information indicates that the HDR stream can be played, and also the display capability information indicates that the HDR video can be displayed, the video stream corresponding to the identification information indicating being the HDR stream may be decided to be the stream to be played, and if the playback capability information indicates that the HDR stream cannot be played, or the display capability information indicates that video of the HDR stream cannot be displayed, the video stream corresponding to the identification information indicating being the SDR stream may be decided to be the stream to be played.

Accordingly, in a case where an HDR stream can be played and can be displayed, video of the HDR stream is output to the display device. Accordingly, video with higher image quality can be output to the display device.

Also, for example, the identification information may further indicate, with regard to each of the one or more video streams, whether or not a first HDR stream is included in the video streams, and whether or not a second HDR stream is included in the video streams. In the deciding, in a case where the identification information indicates that the one or more video streams includes the first HDR stream and the second HDR stream, if the playback capability information indicates that the second HDR stream can be played, and also the display capability information indicates that the second HDR stream can be displayed, the video stream corresponding to the identification information indicating being the second HDR stream may be decided to be the stream to be played, and if the playback capability information indicates that the first HDR stream can be played, and also the display capability information indicates that the first HDR stream can be displayed, and the playback capability information indicates that the second HDR stream cannot be played, or the display capability information indicates that the second HDR stream cannot be displayed, the video stream corresponding to the identification information indicating being the first HDR stream may be decided to be the stream to be played.

Also, for example, the second HDR stream may be a video stream with a higher predetermined priority than the first HDR stream.

Accordingly, in a case where the second HDR stream with higher priority can be played and can be displayed, video of the second HDR stream of which priority is higher can be output to the display device. Accordingly, more appropriate video can be output to the display device.

An embodiment of the present disclosure will be described below with reference to the drawings.

Embodiment

An embodiment of a playback method according to the present disclosure will be described with reference to the drawings. FIG. 1 is a schematic diagram illustrating a home theater system that uses a playback device according to the present disclosure. This home theater system is capable of displaying, in addition to 3840-pixel×2160-pixel (hereinafter, referred to as "4k") 2D video, HDR video. The home theater system plays a BD-ROM disc 101, and includes a playback device 102, a display device 103, and a remote controller 104.

The BD-ROM disc 101 is a read-only recording medium. The BD-ROM disc 101 stores a movie as contents, for example. The contents include a video stream representing a 4K 2D video. The 4K 2D video includes one or the other of an HDR stream and an SDR stream that are HDR video and SDR video, or both. These video streams are laid out on the BD-ROM disc 101 in increments of extents, and accessed by the playback device 102 using a later-described data structure.

The playback device 102 is equipped with a BD-ROM drive 121. The BD-ROM drive 121 is an optical disc drive conformant to the BD-ROM format. The playback device 102 uses the BD-ROM drive 121 to read out video streams from the BD-ROM disc 101. The playback device 102 decodes the video stream that has been read out into video data/audio data, thereby playing the video stream. The playback device 102 can play video streams as either SDR 4K 2D video or HDR 4K 2D video. Hereinafter, an operation mode of the playback device 102 when playing SDR 4K 2D video will be referred to as "SDR playback mode", and an operation mode of the playback device 102 when playing HDR 4K 2D video will be referred to as "HDR playback mode".

The playback device 102 is connected to the display device 103 by a High-Definition Multimedia Interface (HDMI (a registered trademark)) cable 122. The playback device 102 converts the video data/audio data obtained by decoding the video stream into HDMI (registered trademark) format video signals/audio signals (also called playback signals), and transmits to the display device 103 via the HDMI (registered trademark) cable 122. The playback device 102 further exchanges Consumer Electronics Control (CEC) messages with the display device 103 via the HDMI (registered trademark) cable 122. Accordingly, the playback device 102 can query the display device 103 regarding whether HDR video can be displayed or not.

The display device 103 is a liquid crystal display for example. The display device 103 displays video on a screen 131 following video signals, and emits sound from built-in speakers following audio signals. The display device 103 is capable of displaying HDR video.

The remote controller 104 includes an operating unit and a transmitting unit. The operating unit includes multiple buttons. The buttons are correlated to various functions of the playback device 102 and display device 103, such as on/off of power, starting or stopping playing of the BD-ROM disc 101, and so forth. The operating unit detects a user pressing the buttons, and notifies the transmitting unit of identification information of the button by signals. The transmitting unit converts the signals from the operating unit into infrared (or some other wireless format) signals IR, and sends to the playback device 102 or display device 103. On the other hand, the playback device 102 and display device 103 each receive the signals IR transmitted from the remote controller 104, and execute the functions that the signals IR indicate. Thus, the user can remotely operate the playback device 102 and display device 103.

Figure 2:
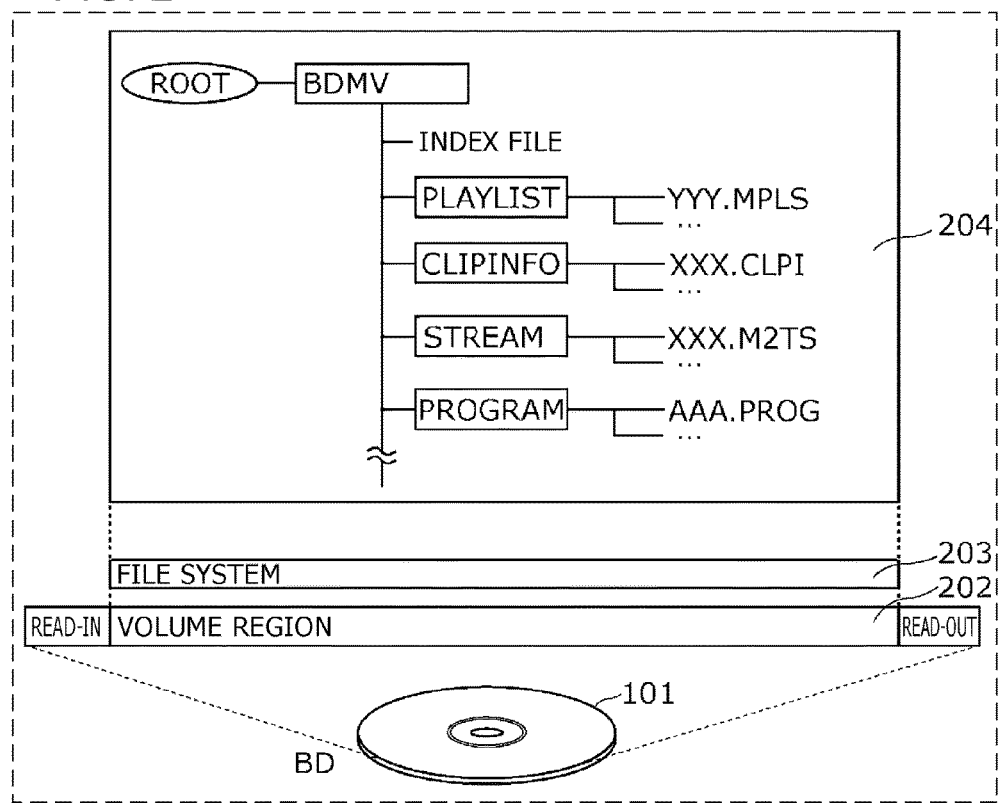
FIG. 2 is a diagram illustrating the configuration of a BD-ROM.

Next, the data structure for a BD-ROM, which is the recording medium according to the present disclosure, to store 2D video, will be described. FIG. 2 is a diagram illustrating the configuration of the BD-ROM. In FIG. 2, the BD-ROM disc 101 is illustrated at a fourth tier, and a track 202 on the BD-ROM disc 101 is illustrated at a third tier. The track 202 in FIG. 2 is drawn illustrating the track 202 that is formed in a spiral shape from the inner perimeter of the BD-ROM disc 101 to the outer perimeter, depicted as being extended in the horizontal direction. The BD-ROM disc 101 has a recording region formed in a spiral shape from the inner perimeter to the outer perimeter, and has a volume region between a read-in at the inner perimeter and a read-out at the outer perimeter, where logical data can be recorded in the same way as other optical discs such as DVDs and CDs. The volume region has serial Nos. assigned from the start, in increments of accessing the optical disc, these Nos. being called logical addresses. Reading out data from an optical disc is performed by specifying a logical address. The logical addresses are defined here as being consecutive in the physical layout on the optical disc as well. That is to say, data of which the local addresses are consecutive can be read out without an optical pickup of the BD-ROM drive 121 of the playback device 102 performing a seek. There also is a special region on the inner side of the read-in, called a burst cutting area (BCA), that only the BD-ROM drive 121 can read. This region is not readable by applications, and accordingly is often used for copyright protection technology and the like, for example.

Volume information of the file system is recorded from the start of the volume region, and thereafter application data such as video data is recorded. A file system is an arrangement where data on a disc is expressed in increments called directories and files. The file system used is Universal Disc Format (UDF) in the case of the BD-ROM disc 101. Data recorded in a hard disk of a commonly-used personal computer (PC) in a structure of directories and files also is expressed on the computer by a file system called file allocation table (FAT) or New Technology File System (NTFS), thereby improving usability. This file system enables logical data recorded in the same way as in a normal PC to be read out using a directory and file structure.

A BDMV directory is situated immediately beneath the root directory (ROOT) in the directory and file structure on the BD-ROM disc 101. A BDMV directory is a directory in which data, such as AV contents handled in the BD-ROM disc 101, management information, and so forth, are recorded. An INDEX file where an index table configuring titles is defined, a PLAYLIST directory, a CLIPINFO directory, a STREAM directory, and a PROGRAM directory, are situated beneath the BDMV directory. An AV clip (XXX.M2TS) where AV contents such as video and audio are multiplexed and stored, a clip information file (XXX.CLPI) storing management information of the AV clip, a playlist file (YYY.MPLS) defining the logical playback path of the AV clip, and a BD program file (AAA.PROG) sorting a program for defining a dynamic scenario, are situated beneath the above-described STREAM directory, CLIPINFO directory, PLAYLIST directory, and PROGRAM directory, respectively.

Figure 3:
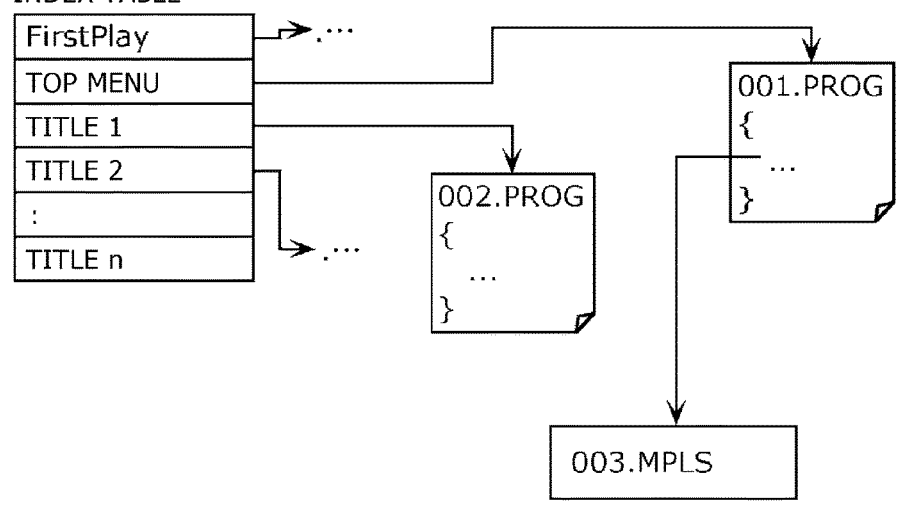
FIG. 3 is a diagram illustrating the inner configuration of an INDEX file.

The data structure of the files situated beneath the BDMV directory will be described below. First, the INDEX file will be described. FIG. 3 is a diagram illustrating the inner stricture of the INDEX file. The INDEX file has an index table, as illustrated in FIG. 3. The index table is a highest-order layer table that defines title configuration, such as all titles stored in the BD-ROM disc 101, the top menu, FirstPlay, and so forth. The table specifies which BD program file is to be executed first, from all titles, top menu, and FirstPlay. The playback device 102 of the BD-ROM disc 101 references the index table each time a title or menu is called up, and executes a predetermined BD program file. The FirstPlay is set by the content provider, and a BD program to be automatically played at the time of playback of the BD-ROM disc 101 is set. Set to the top menu is a BD program file called up when a command "return to menu", for example, is executed by user operations using the remote controller 104.

Returning to FIG. 2, the BD program file (AAA.PROG) stores a program to be executed by being specified by a title. There are multiple program files, with the prefix (AAA) being used to identify the programs. The programs used here are proprietary interpreter-type programs called command navigation in the case of BD, but the language system is not of essence to the present disclosure, so this may be general-purpose programming languages such as Java (registered trademark) or JavaScript (registered trademark). The playlist to be played is specified by the program.

Next, the AV clip (XXX.M2TS) and clip information file (XXX.CLPI) will be described. An AV clip is an MPEG-2 transport stream format digital stream.

FIG. 4 is a diagram illustrating the configuration of an AV clip. As illustrated in FIG. 4, an AV clip is obtained by multiplexing one or more of a video stream, an audio stream, a presentation graphics stream (PG), and an interactive graphics stream (IG). Video stream represents a main video and sub-video of a movie, audio stream represents the main audio portion of the movie and sub-audio to be mixed with the main audio, and presentation graphics stream represents subtitles of the movie. The main video here means the normal video displayed on the screen, and the sub-video means video displayed in a small screen within the main video. An interactive graphics stream means an interactive screen that is created by disposing GUI parts on the screen. A video stream is encoded by a format such as MPEG-2, MPEG-4 AVC, SMPTE VC-1, or the like. An audio stream is encoded by a format such as AC-3, Dolby Digital Plus (registered trademark), Meridian Lossless Packing (MLP (registered trademark)), Digital Theater System (DTS (registered trademark)), DTS-HD, linear pulse code modulation (PCM), or the like.

The configuration of a video stream will be described. In moving image compression encoding such as MPEG-2, MPEG-4 AVC, SMPTE VC-1, or the like, the amount of data is compressed using redundancy in the spatial direction and temporal direction of the moving image. Inter-picture prediction encoding is used as a method for using redundancy in the temporal direction. In inter-picture prediction encoding, when encoding a certain picture, a picture before of after in display time order is taken as a reference picture. The amount of motion is detected from that reference picture, and the redundancy in the spatial direction is removed with regard to the difference between the picture which has been subjected to motion compensation and the picture to be encoded, thereby compressing the data amount.

Here, a picture that has no reference picture, and where intra-picture prediction encoding is performed only using the picture to be encoding, is called an I picture. A picture is one encoding increment that encompasses both frame and field. A picture regarding which inter-picture prediction encoding is performed referencing one picture that has already been processed is called a P picture, a picture regarding which inter-picture prediction encoding is performed simultaneously referencing two pictures that have already been processed is called a B picture, and a B picture that is referenced by another picture is called a Br picture. A frame, in a case of a frame structure, or a field, in a case of a field structure, is called a video access unit here.

Each stream included in an AV clip is identified by a Packet ID (PID). PIDs are allocated as follows, for example. 0x1011 is for a video stream used as the video of a movie, 0x1100 through 0x111F is for audio streams, 0x1200 through 0x121F is for presentation graphics, 0x1400 through 0x141F is for interactive graphics streams, 0x1B00 through 0x1B1F is for video streams used for sub-video of a movie, and 0x1A00 through 0x1A1F are for audio streams to be used for sub-audio to be mixed with the main audio.

Figure 5:
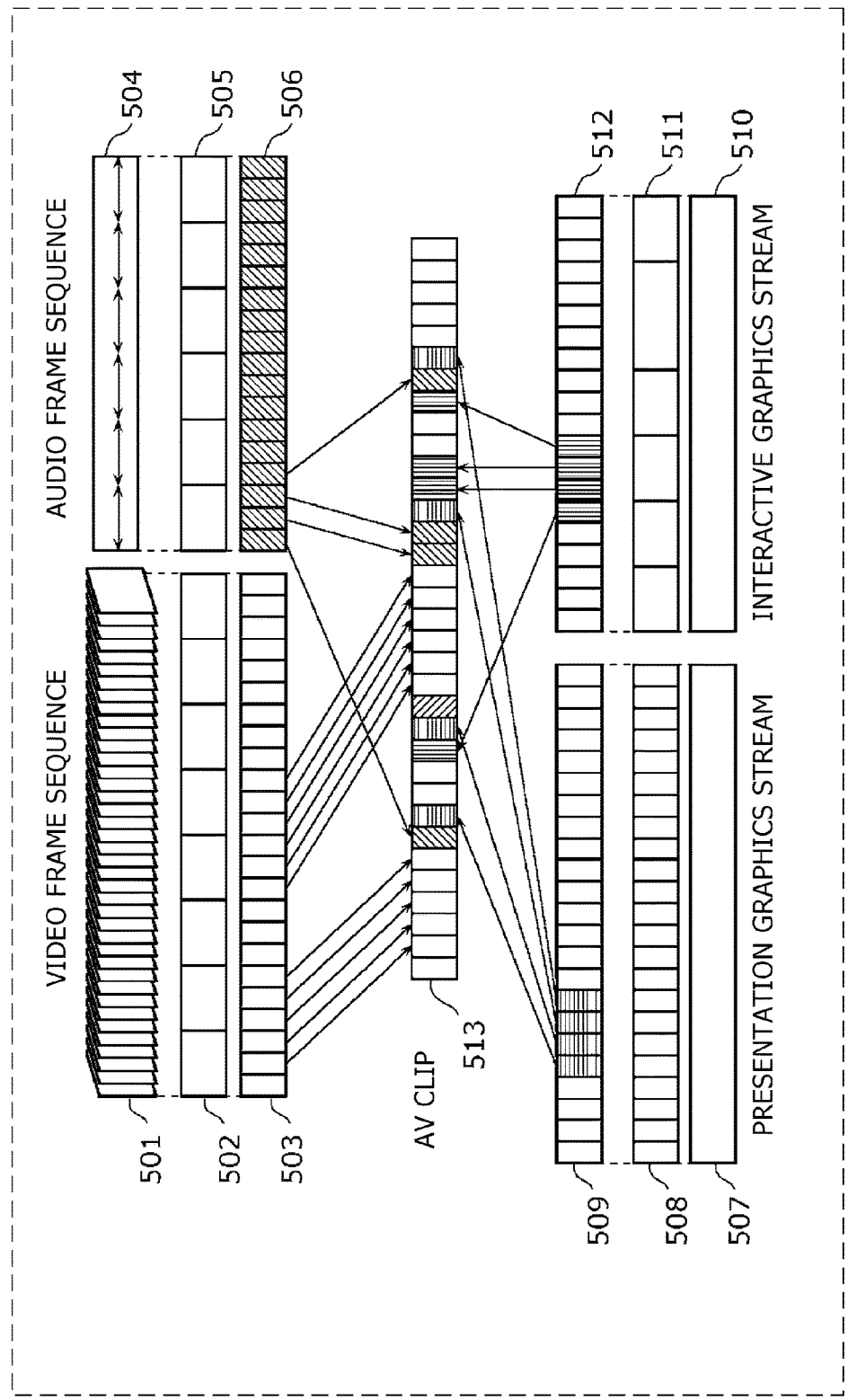
FIG. 5 is a diagram schematically illustrating each stream multiplexed in an AV clip.

FIG. 5 is a diagram schematically illustrating streams multiplexed in an AV clip. First, a video stream 501 made up of multiple video frames and an audio stream 504 made up of multiple audio frames are respectively converted into packetized elementary stream (PES) packet sequences 502 and 505, and further converted into transport stream (TS) packets 503 and 506. In the same way, a presentation graphics stream 507 and an interactive graphics stream 510 are respectively converted into PES packet sequences 508 and 511, and further converted into TS packets 509 and 512. An AV clip 513 is configured by multiplexing these TS packets 503, 506, 509, and 512 on a single stream.

Figure 6:
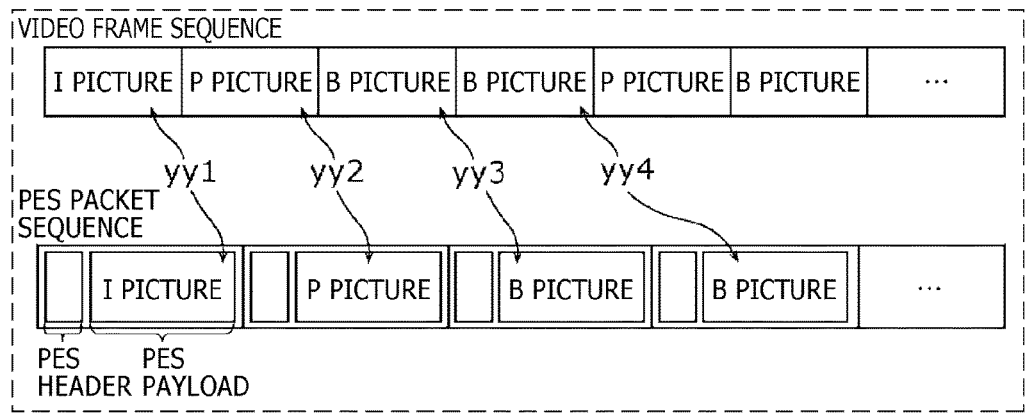
FIG. 6 is a diagram illustrating a video frame sequence stored in a PES packet sequence in detail.

FIG. 6 is a diagram describing a video frame sequence stored in the PES packet sequence in detail. The video frame sequence of the video stream is illustrated at the upper half in FIG. 6, and a PES packet sequence at the lower half. An I picture yy1, P picture yy2, and B pictures yy3 and yy4, that are multiple Video Presentation Units in the video stream, are divided into individual pictures, and the divided pictures are stored in payloads of PES packets, as illustrated in FIG. 6. The PES packets each have a PES header, with PTS (Presentation Time-Stamp) that is the display time of the picture and DTS (Decoding Time-Stamp) that is the decoding time of the picture, being stored in the PES header.

Figure 7:
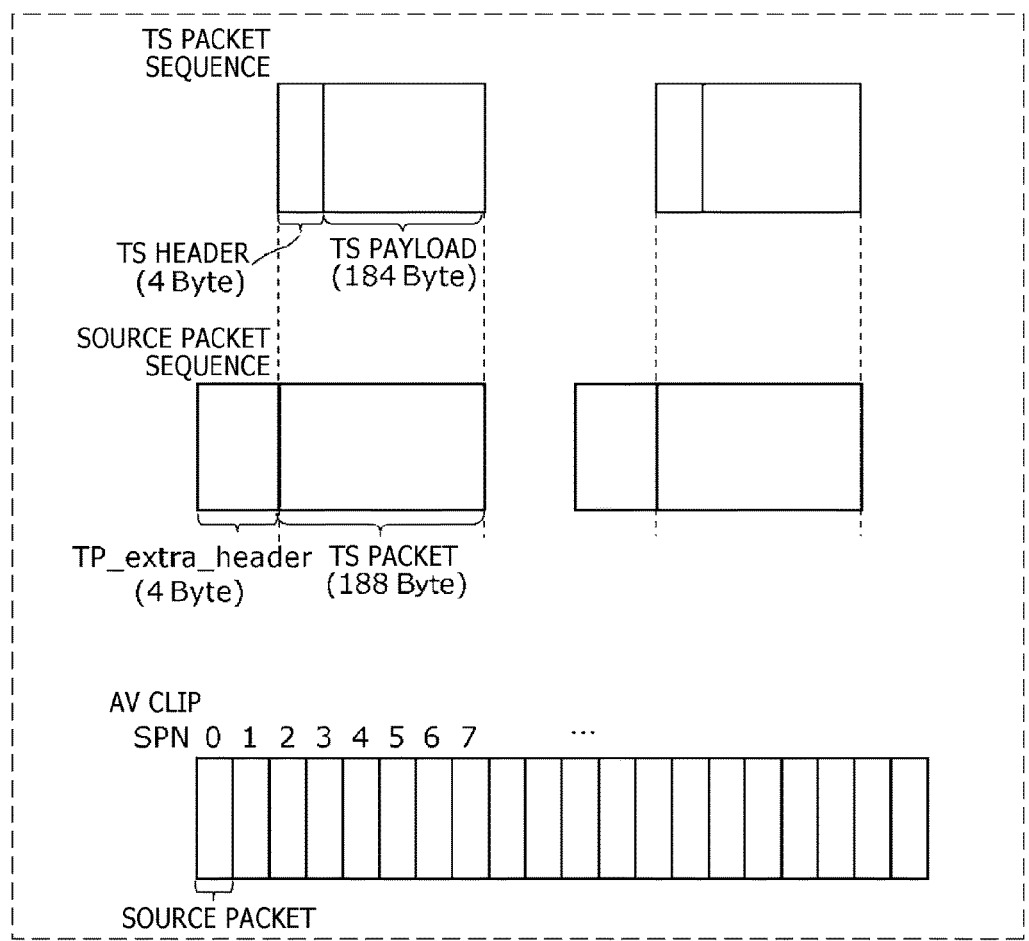
FIG. 7 is a diagram illustrating the configuration of TS packets and source packets in an AV clip.

FIG. 7 is a diagram illustrating the structure of TS packets and source packets in an AV clip. A TS packet sequence has multiple TS packets, as illustrated in FIG. 7. Each of the multiple TS packets is a fixed-length packet of 188 Bytes, made up of a 4-Byte TS header that has information such as the PID identifying the stream, and a 184-Byte TS payload that stores data, with the above-described PES packets being divided and stored in TS payloads. In the case of BD-ROM, a 192-Byte source packet is configured by a 4-byte TP_Extra_Header being imparted to a TS packet, and each source packet is written to the AV clip. Information such as ATS (Arrival_Time_Stamp) is described in the TP_Extra_Header. ATS indicates a transfer start time to a PID filter of a later-described system target decoder 1503. A No. incremented from the start of the AV clip is called a source packet number (SPN).

TS packets included in an AV clip also include, besides the video, audio, subtitle, and other such streams, a Program Association Table (PAT), Program Map Table (PMT), Program Clock Reference (PCR), and so forth. The PAT indicates what the PID of the PMT used in the AV clip is. The PID of the PAT itself is registered as 0. The PMT has the PIDs of video, audio subtitle, and other such streams included in the AV clip, and attribute information corresponding to each PID. The PMT also has various types of descriptors relating to the AV clip. Descriptors include copy control information indicating whether copying of the AV clip is permissible or impermissible, and so forth. In order to synchronize with an Arrival Time Clock (ATC) that is the temporal axis of ATS, and System Time Clock (STC) that is the temporal axis of PTS and DTS, the PCR has information of STC time corresponding to the ATS of that PCT packet being transferred to the decoder.

Figure 8:
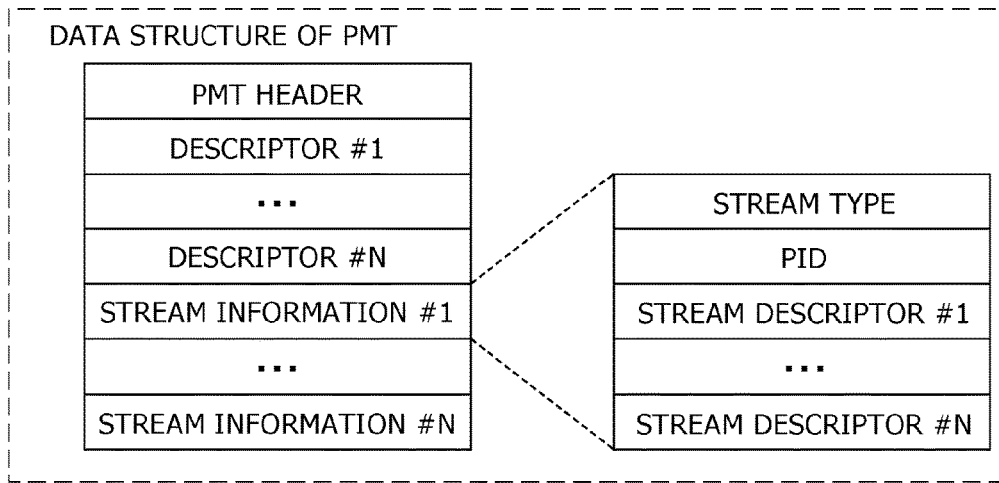
FIG. 8 is a diagram illustrating the data structure of a PMT.

FIG. 8 is a diagram for describing the data structure of a PMT in detail. Situated at the start of the PMT is a PMT header describing the length of data include in that PMT, and so forth. Thereafter follows multiple descriptors relating to the AV clip. The above-described copy control information and so forth is described as descriptors. After the descriptors follow multiple stream informations relating to the streams included in the AV clip. The stream information is configured of stream type for identifying the compression codec of the stream, the PID of the stream, and stream descriptors describing attribute information of the stream (frame rate, aspect ratio, and so forth). There are as many stream descriptors as there are streams existing in the AV clip.

Figure 9:
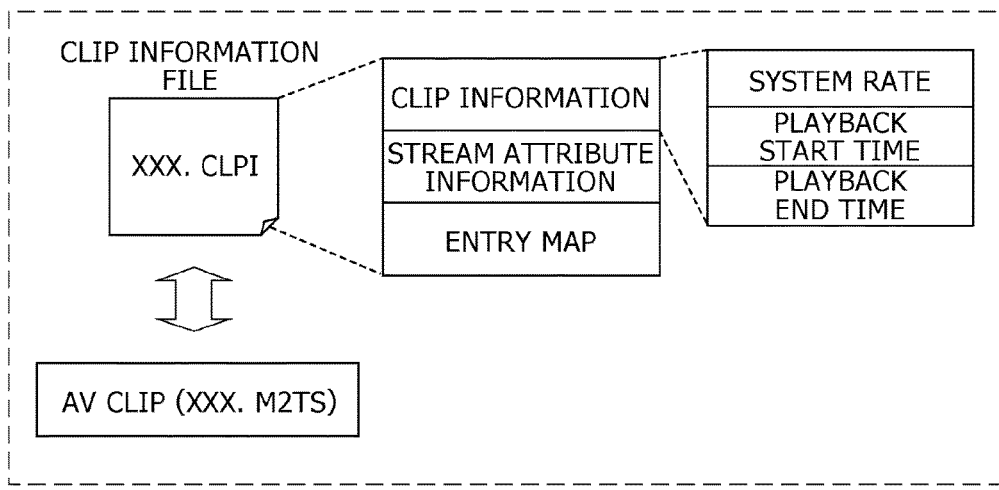
FIG. 9 is a diagram illustrating the inner configuration of a clip information file.

FIG. 9 is a diagram illustrating the inner configuration of a clip information file. A clip information file is management information of an AV clip, and corresponds to the AV clip in a one-on-one manner, as illustrated in FIG. 9. The clip information file is configured of clip information, stream attribute information and an entry map.

Clip information is made up of system rate, playback start time, and playback end time, as illustrated in FIG. 9. The system rate indicates the maximum transfer rate to the AV clip to the PID filter of the system target decoder which will be described later. The interval between ATSs included in the AV clip is set to be within the system rate. The playback start time is the PTS of the first video frame in the AV clip, and the playback end time is set to a figure obtained by adding the PTS of the video frame at the end of the AV clip to one frame worth of playback interval.

Figure 10:
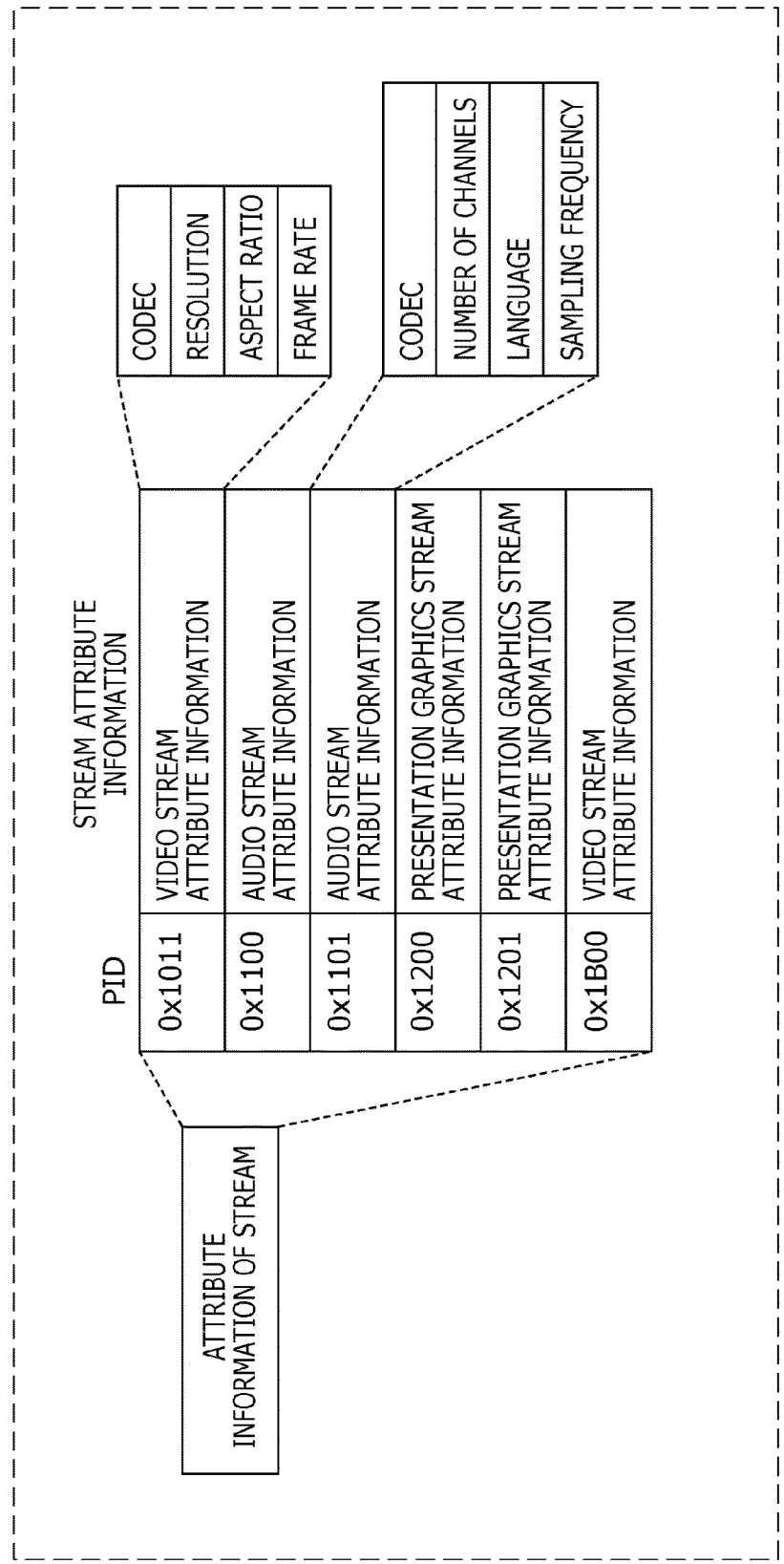
FIG. 10 is a diagram illustrating the inner configuration of stream attribute information.

FIG. 10 is a diagram illustrating the inner configuration of stream attribute information. Stream attribute information is attribute information regarding each stream included in the AV clip being registered for each PID, as illustrated in FIG. 10. There are mutually different types of attribute information for stream attribute information, corresponding to each of video streams, audio streams, presentation graphics streams, and interactive graphics streams. Video stream attribute information includes information indicating what sort of compression codec the corresponding video stream has been compressed by, what is the resolution of each picture data making up this video stream, what is the aspect ratio, what is the frame rate, and so forth. Audio stream attribute information includes information indicating what sort of compression coded the corresponding audio stream has been compressed by, how many channels are included in this audio stream, which languages are handed, what is the sampling frequency, and so forth. Such information is used for initialization of the decoder before playback at the playback device.

Figure 11:
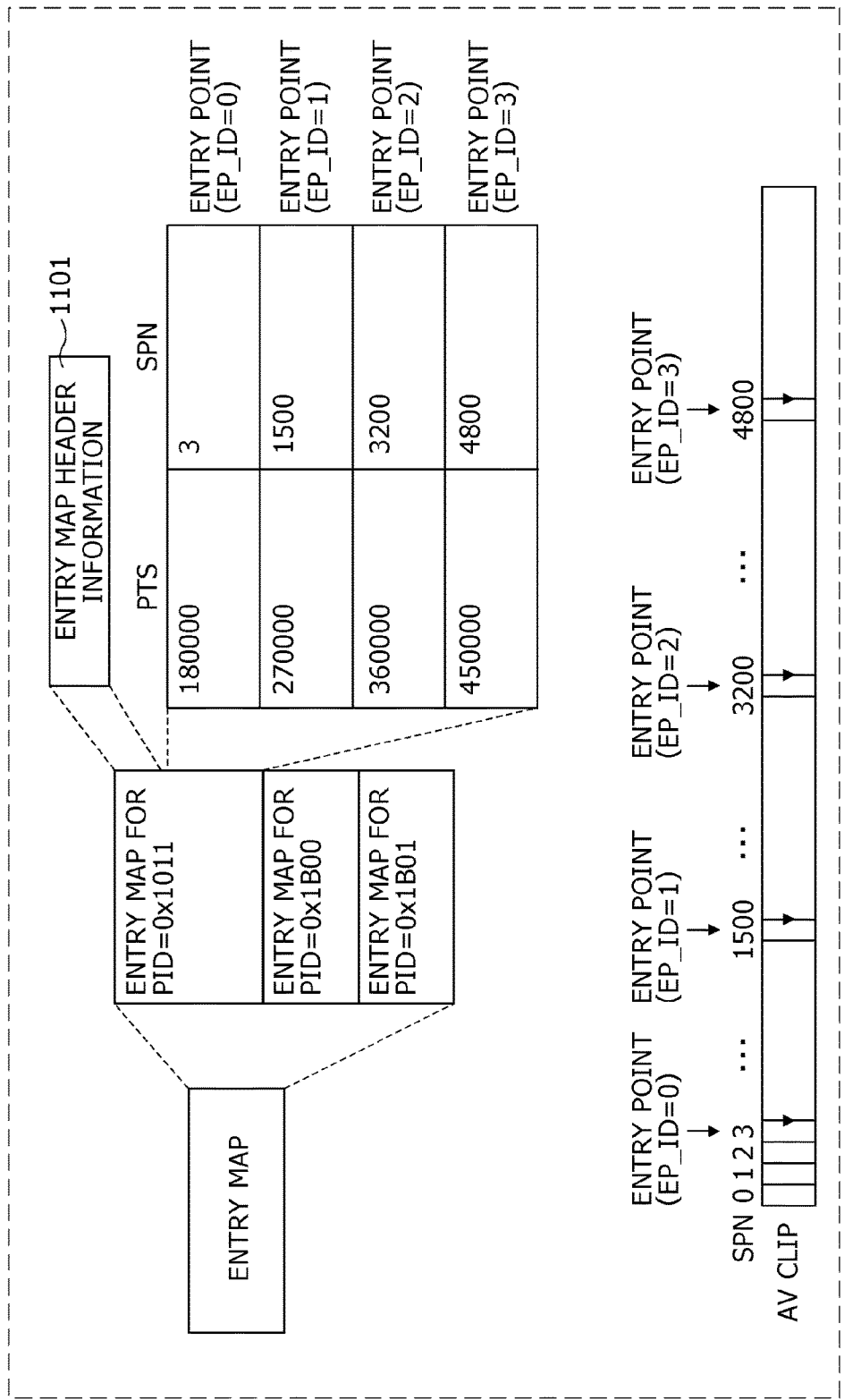
FIG. 11 is a diagram illustrating the inner configuration of an entry map.

FIG. 11 is a diagram illustrating the inner configuration of an entry map. An entry map is table information where entry map header information 1101, a PTS indicating the display time of each I picture in a video stream included in the AV clip and an SPN of the AV clip that each I picture starts, as illustrated in FIG. 11. The pair of PTS and SPN information indicated in one row of the table will be referred to as an entry point. A value that starts at 0 and is incremented at each entry point will be called entry point ID (hereinafter referred to as "EP_ID"). Using this entry map enables the file position of the AV clip corresponding to any point on the temporal axis of the video stream to be identified by the playback device. For example, when performing special playback like fast-forward or rewind, processing can be performed efficiently without analyzing the AV clip, by identifying the I picture registered in the entry map, and playing from the identified I picture. An entry map is created for each video stream multiplied within the AV clip, and managed by PIDs. The entry map header information 1101 is stored at the start of the entry map. The entry map header information 1101 stores information such as the PID of the video stream that this entry map points to, the number of entry points, and so forth.

Figure 12:
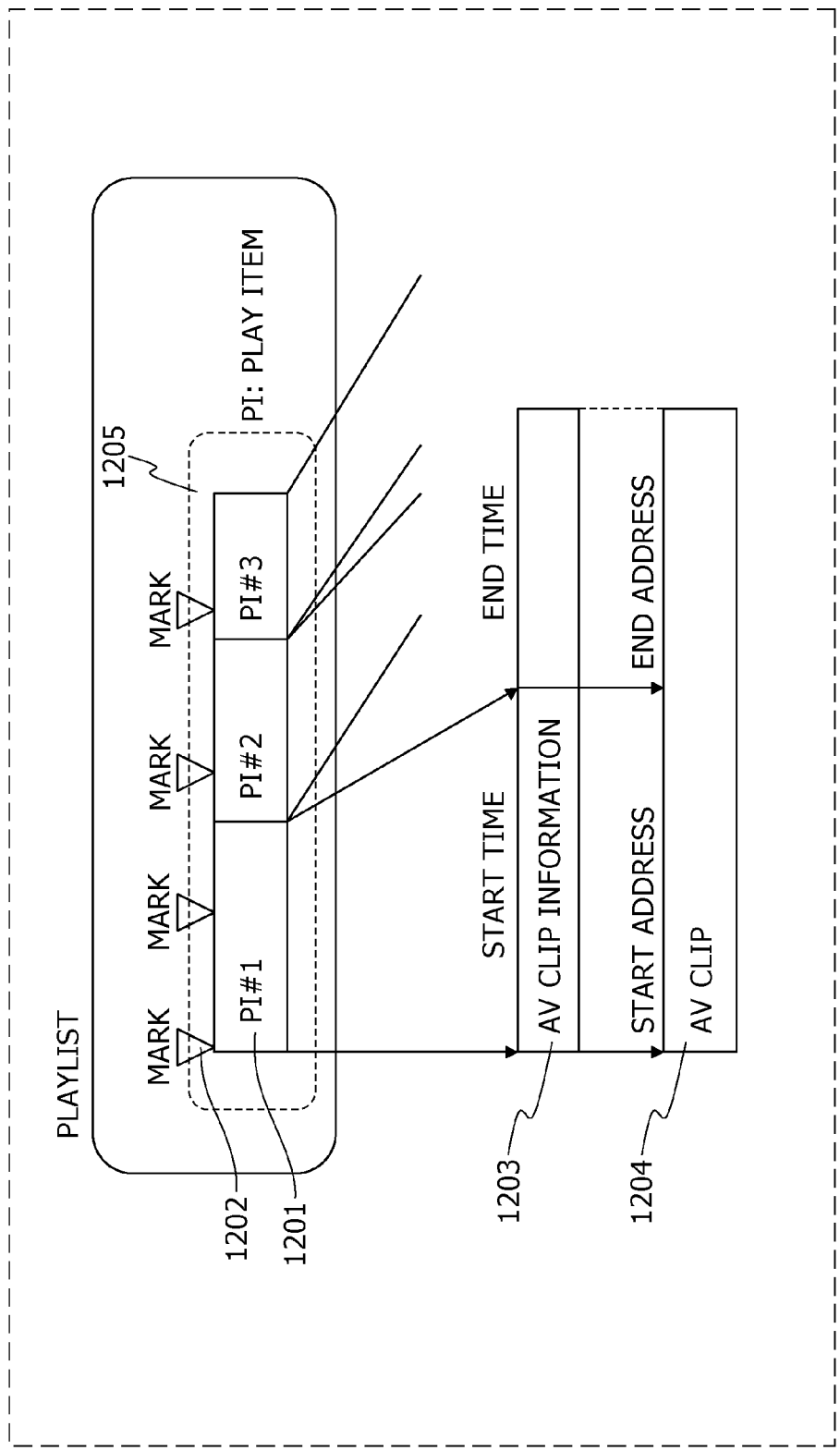
FIG. 12 is a diagram illustrating the inner configuration of a playlist.

Next, the playlist file (YYY.MPLS) will be Described. FIG. 12 is a diagram illustrating the inner configuration of a playlist. A playlist indicates the playback path of an AV clip 1204. A playlist is made up of one or more play items 1201, each play item indicating a playback section with regard to the AV clip 1204, as illustrated in FIG. 12. Each play item 1201 is identified by a play item ID, and is stored in the proper order of playback in the playlist. The playlist includes entry marks 1202 indicating playback start points. An entry mark 1202 is provided to a playback section defined by each play item. As illustrated in FIG. 12, an entry mark 1202 is provided to a position of a play item that can serve as a playback start position, and is used for cue playback. For example, by providing an entry mark 1202 at a position that is the start of a chapter in a movie title, the playback of the chapter can be started from the start of this chapter. The playback path of the series of play items is defined as a main path 1205. The third AV clip information 1203 is information where decode time/display time from the start of the AV clip 1204, and logical address of the AV clip 1204, have been correlated.

Figure 13:
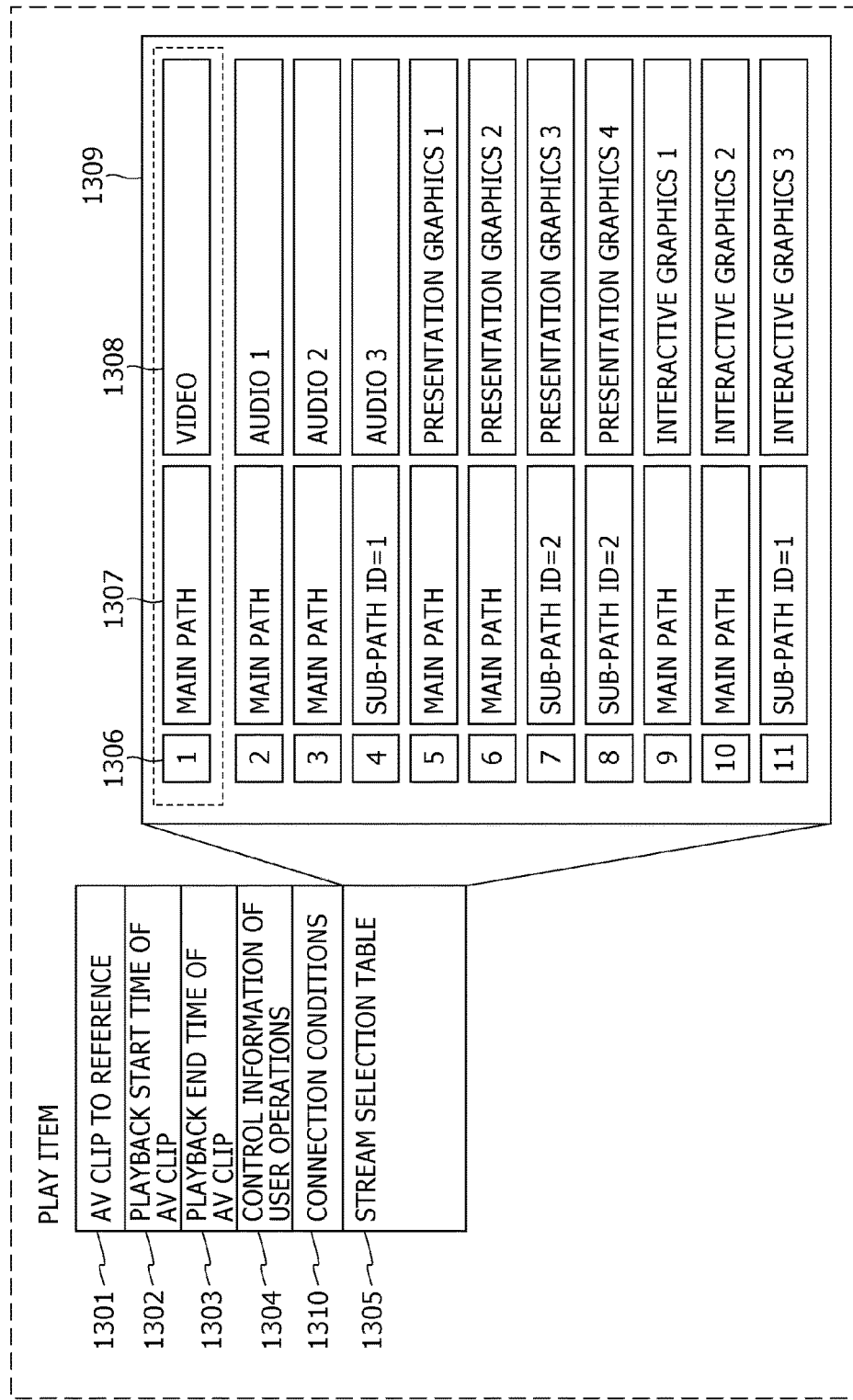
FIG. 13 is a diagram illustrating the inner configuration of a play item.

The content of a play item will be described. FIG. 13 is a diagram illustrating the inner configuration of a play item. A play item includes clip information 1301 that is played (referenced), playback start time 1302, playback end time 1303, connection condition 1310, and stream election table 1305. The playback start time and playback end time are time information, so the playback device references the entry map of the clip information file, and acquires SPNs corresponding to the specified playback start time and playback end time. The playback device identifies the read start position from the acquired SPN, and performs playback processing. The connection conditions 1310 indicates the connection type with a preceding play item.

In a case where the connection conditions 1310 of a play item is "1", this means that seamless connection between the AV clip that the play item points to and the AV clip that the play item before this play item points to is not guaranteed. In a case where the connection conditions 1310 is "5" or "6", this means that seamless connection between the AV clip that the play item points to and the AV clip that the play item before this play item points to is guaranteed.

In a case where the connection conditions 1310 is "5", connectivity of STCs among play items may cut off. That is, in this case, the video display time of the end of the AV clip of the play item before the connection and the video display time of the start of the AV clip of the play item following connection may be non-continuous. Note however, that the AV clip must be created so that decoding by the later-described system target decoder 1503 does not fail when the AV clip of the play item after connection is input to the PID filter of the system target decoder 1503 and played following inputting the AV clip of the play item before connection. There also are constricting conditions such as the end frame of the audio of the AV clip in the play item before connection and the start frame of the audio of the AV clip in the play item after connection having to overlap on the playback temporal axis, and so forth.

Also, in a case where the connection conditions 1310 is "6", the AV clip of the play item before connection and the AV clip of the play item after connection must be playable as a single AV clip when joined. That is to say, the STCs are continuous and the ATCs are continuous between the AV clip of the play item before connection and the AV clip of the play item after connection.

The stream election table 1305 is made up of multiple stream entries 1309. Each stream entry 1309 is made up of a stream selection No. 1306, stream path information 1307, and stream identification information 1308.

The stream selection No. 1306 is a No. incremented in order from the start of the stream entry 1309 included in the stream selection table, and is a No. used by the playback device to identify streams.

The stream path information 1307 is information indicating which AV clip a stream indicated by the stream identification information 1308 is multiplexed with. If the stream path information 1307 is "main path" for example, this indicates the AV clip of the relevant play item, and if "sub-path ID=1", this indicates the AV clip of the sub-play item corresponding to the playback section of this play item in the sub-path indicated by that sub-path ID. Sub-paths will be described in the next section.

The stream identification information 1308 is information such as a PID, and indicates a stream multiplexed on the AV clip being referenced. The stream entry 1309 also has recorded therein attribute information of each stream. The attribute information of each stream is information indicating the nature of the corresponding stream, and for example includes language attributes or the like, in a case of audio, presentation graphics, or interactive graphics.

Figure 14:
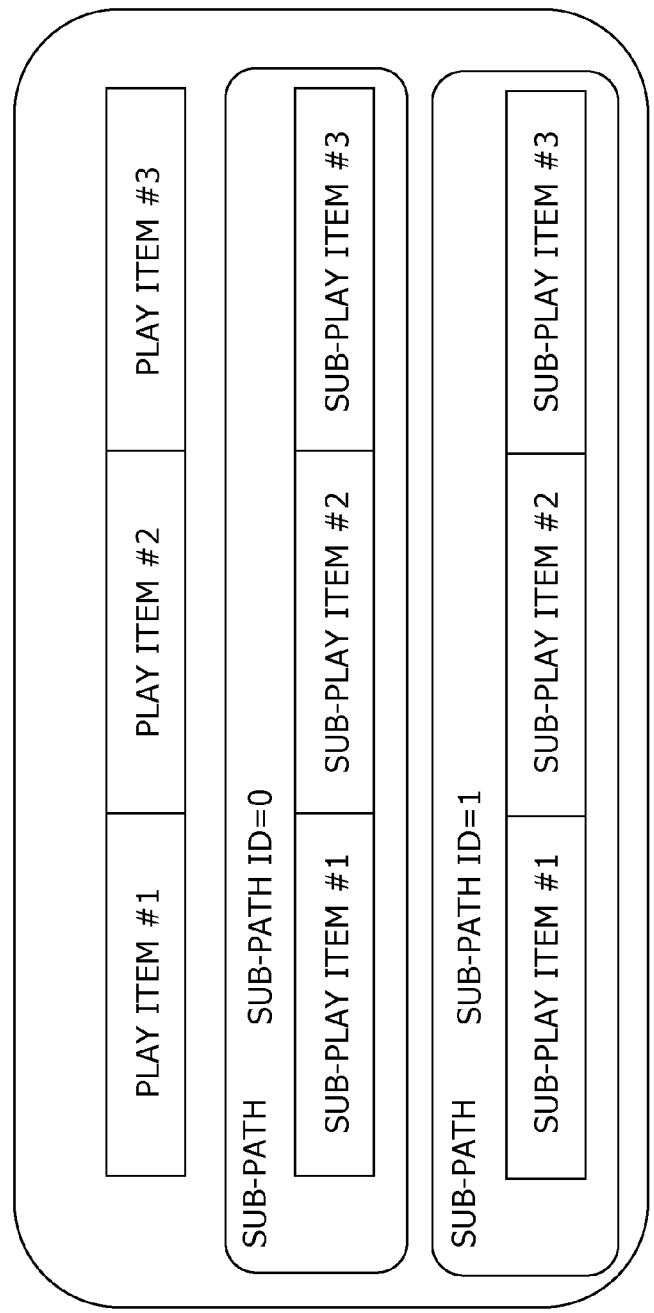
FIG. 14 is a diagram illustrating the inner configuration of a playlist including sub-paths.

Next, a playlist including sub-paths will be described. FIG. 14 is a diagram illustrating the inner configuration of a playlist including sub-paths. A playlist may have one or more sub-paths, as illustrated in FIG. 14. A sub-path is imparted an ID as a sub-path ID, in order of registration in the playlist. A sub-path ID is used to identify sub-paths. A sub-path indicates a series of playback paths, played synchronously with the main path. A sub-play item has clip information 1301, playback start time 1302, and playback end time 1303, for playing in the same way as a play item. The playback start time 1302 and playback end time 1303 of a sub-play item is expressed on the same temporal axis as the main path. For example, in a case where a certain stream entry 1309 registered in the stream election table 1305 for a play item #2 indicates presentation graphics 1 in sub-path ID=0, the presentation graphics 1 multiplexed in the AV clip of the sub-play item #2 to be played synchronously with the playback section of the play item #2 in sub-path ID=0 is to be played in the play item #2 playback section. Also, a sub-play item also has a field called SP connection conditions, that has the same meaning as the connection conditions of a play item. An AV clip at the boundary of a sub-play item where the SP connection conditions are "5" or "6" must keep the same conditions as described above for connection conditions of "5" or "6". Thus, the data structure of the BD-ROM that is the recording medium according to the present disclosure, for storing 2D video, has been described.

Figure 15:
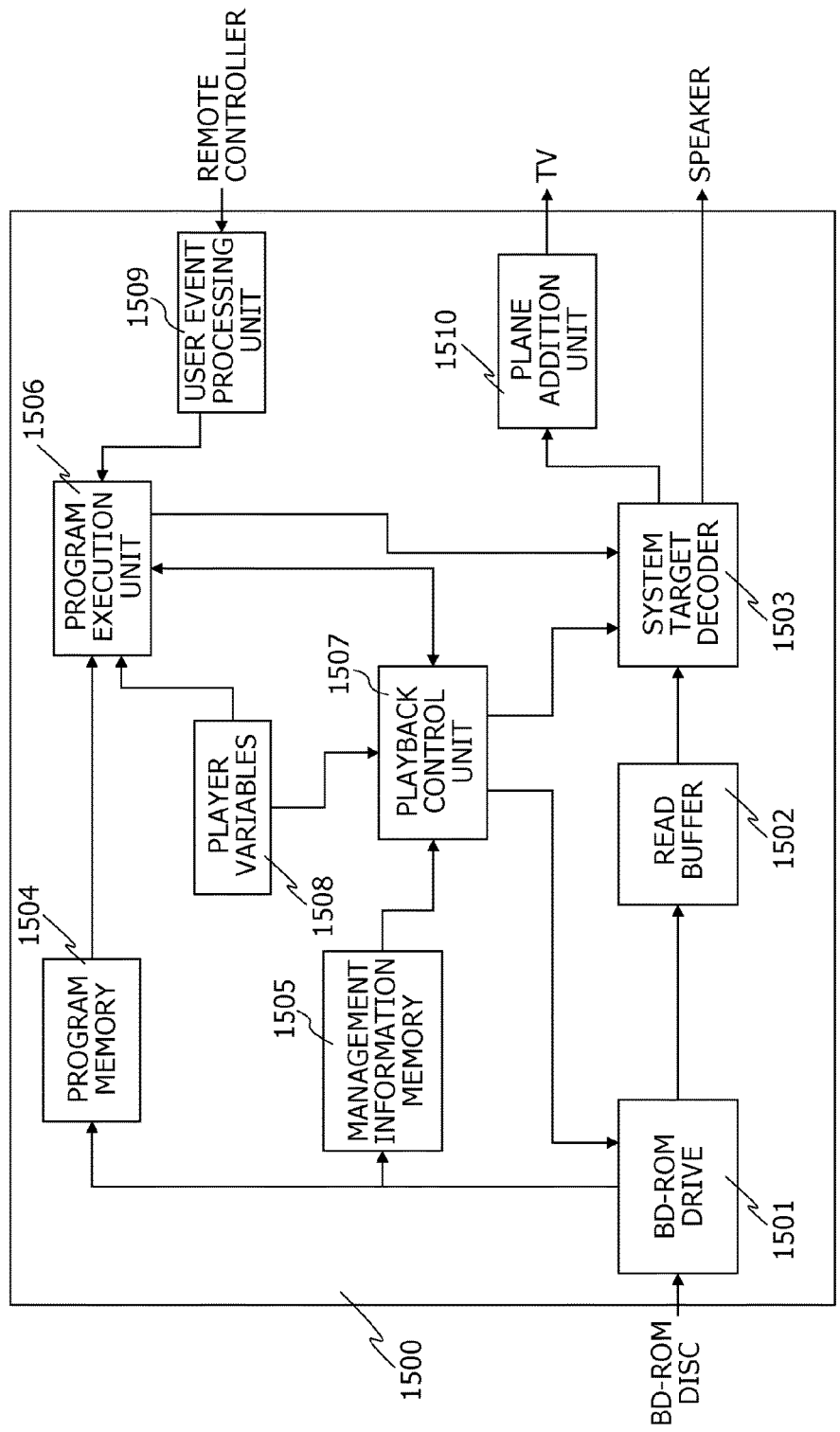
FIG. 15 is a diagram illustrating the inner configuration of a playback device.

Next, a playback device (2D playback device) for playing the BD-ROM storing the 2D video according to the present disclosure will be described. FIG. 15 is a diagram illustrating the inner configuration of a playback device. A 2D playback device 1500 is made up of a BD-ROM drive 1501, a read buffer 1502, the system target decoder 1503, program memory 1504, management information memory 1505, a program execution unit 1506, playback control unit 1507, player variables 1508, a user event processing unit 1509, and a plane addition unit 1510.

The BD-ROM drive 1501 reads out various types of data from the BD-ROM disc based on requests from the playback control unit 1507. AV clips read out from the BD-ROM disc is transferred to the read buffer 1502, INDEX files, playlist files, and clip information files to the management information memory 1505, and BD program files to the program memory 1504.

The read buffer 1502 stores the data read out using the BD-ROM drive, the management information memory 1505 stores management information of the INDEX files, playlist files, and clip information files, and the program memory 1504 stores BD program files. The management information memory 1505 and program memory 1504 are buffers configured of memory or the like.

The system target decoder 1503 performs demultiplexing processing of source packets read into the read buffer 1502, and performs decoding processing of streams. The system target decoder 1503 acquires information such as codex type and stream attributes and so forth, that is necessary for decoding the streams included in the AV clip, from the playback control unit 1507. The system target decoder 1503 writes the decoded main video stream, sub-video streams, interactive graphics streams, and presentation graphics streams, to a main video plane, sub-video plane, interactive graphics plane (IG plane), and presentation graphics plane (PG plane), which are respective plane memory. The system target decoder 1503 also mixes the decoded main audio stream and sub-audio streams, and outputs the mixed results to the speakers or the like. The system target decoder 1503 also decodes graphics data such as JPEG, PNG, and so forth, for display in menus and the like, transferred from the program execution unit 1506, and performs processing of writing to the image plane. The system target decoder 1503 will be described in detail later.

The user event processing unit 1509 commissions the program execution unit 1506 and playback control unit 1507 to execute processing in response to user operations through the remote controller. For example, in a case where a button is pressed on the remote controller, the program execution unit 1506 is commissioned to execute a command included in that button. For example, in a case where the fast-forward button or rewind button is pressed on the remote controller, the playback control unit 1507 is commanded to execute fast-forward processing or rewind processing on the AV clip in the playlist that currently is being played.

The playback control unit 1507 controls the BD-ROM drive 1501 and system target decoder 1503 to control playback of AV clips. The playback control unit 1507 interprets playlist information and controls playback processing of AV clips, based on playback commands from the program execution unit 1506 and notifications from the user event processing unit 1509. The playback control unit 1507 also performs settings and reference of player variables 1508, and performs playback operations.

The player variables 1508 include system parameters (SPRM) indicating the state of the playback device, and general parameters (GPRM) usable in general uses.

FIG. 16 is a diagram illustrating a list of system parameters (SPRM).

SPRM(0): Language code
SPRM(1): Main audio stream No.
SPRM(2): Subtitle stream No.
SPRM(3): Angle No.
SPRM(4): Title No.
SPRM(5): Chapter No.
SPRM(6): Program No.
SPRM(7): Cell No.
SPRM(8): Selected key information
SPRM(9): Navigation timer
SPRM(10): Playback time information
SPRM(11): Mixing mode for karaoke
SPRM(12): Country information for parental
SPRM(13): Parental level
SPRM(14): Player setting value (video)
SPRM(15): Player setting value (audio)
SPRM(16): Language code for audio stream
SPRM(17): Language code for audio stream (extended)
SPRM(18): Language code for subtitle stream
SPRM(19): Language code for subtitle stream (extended)
SPRM(20): Player region code
SPRM(21): Sub-video stream No.
SPRM(22): Sub-audio stream No.
SPRM(23): Playback state
SPRM(24): 3D video playback capabilities
SPRM(25): HDR video/graphics playback capabilities
SPRM(26): HDR display capabilities
SPRM(27): HDR output mode
SPRM(28): HDR output preferences
SPRM(29): reserved
SPRM(30): reserved
SPRM(31): reserved
SPRM(32): reserved SPRM(10) is updated each time each of the picture data belonging to the AV clip is displayed. That is to say, when the playback device displays new picture data, SPRM(10) is updated to the value that the display time (PTS) of the new picture data indicates. Referencing this SPRM(10) enables the current playback point to be found.

The language code for audio stream in SPRM(16) and the language code for subtitle stream in SPRM(18) indicate the default language code of the playback device, and are items that can be set by OSD of the playback device or the like. For example, in a case where the language code for audio stream in SPRM(16) is English, functions of searching for a stream entry having the same language code from the stream selection table of the play item, and selecting and playing that audio stream, can be included in the BD program file.

SPRM(25) includes information indicating whether or not the system target decoder 1503 is capable of decoding a main video stream of HDR image quality. This also includes information indicating whether or not graphics data such as JPEG, PNG, and so forth transferred from the program execution unit 1506 can be converted into HDR image quality.

SPRM(26) includes information indicating whether or not a display device such as a television or the like connected to the playback device is capable of displaying HDR video.

SPRM(27) includes information indicating the state of whether the playback device will output display data output from the plane addition unit 1510 to the connected display device as HDR image quality or SDR image quality.

SPRM(28) includes user preference information regarding whether the playback device outputs in HDR image quality preferentially or outputs in SDR image quality preferentially.

The playback control unit 1507 performs playback while checking the states of the system parameters. SPRM(1), SPRM(2), SPRM(21), and SPRM(22) indicate the audio stream No., subtitle stream No., and sub-video stream and sub-audio stream Nos., respectively, these values corresponding to the above-described stream selection No. 1306. For example, a case will be assumed where the program execution unit 1506 has changed the audio stream No. SPRM(1). In the stream election table 1305 of the play item currently being played, the playback control unit 1507 compares with the stream selection No. 1306, references the matching stream entry 1309, and switches the audio stream being played. Thus, which audio stream, which subtitle stream, and which sub-video stream to play, is switched.

The program execution unit 1506 is a processor that executes programs stored in the BD program file. The program execution unit 1506 performs operations according to stored programs, and performs the following control.

(1) Commanding the playback control unit 1507 to play a playlist.

(2) Transferring PNG/JPEGs for graphics for menus and games to the system target decoder, and displaying on the screen. These controls can be freely performed in accordance with how the program is built, and how control is effected is decided by a programming process of a BD program file by an authoring process.

The plane addition unit 1510 instantaneously superimposes the main video plane, sub-video plane, interactive graphics plane, presentation graphics plane, and image plane, and displays on a screen such as a TV.

Figure 17:
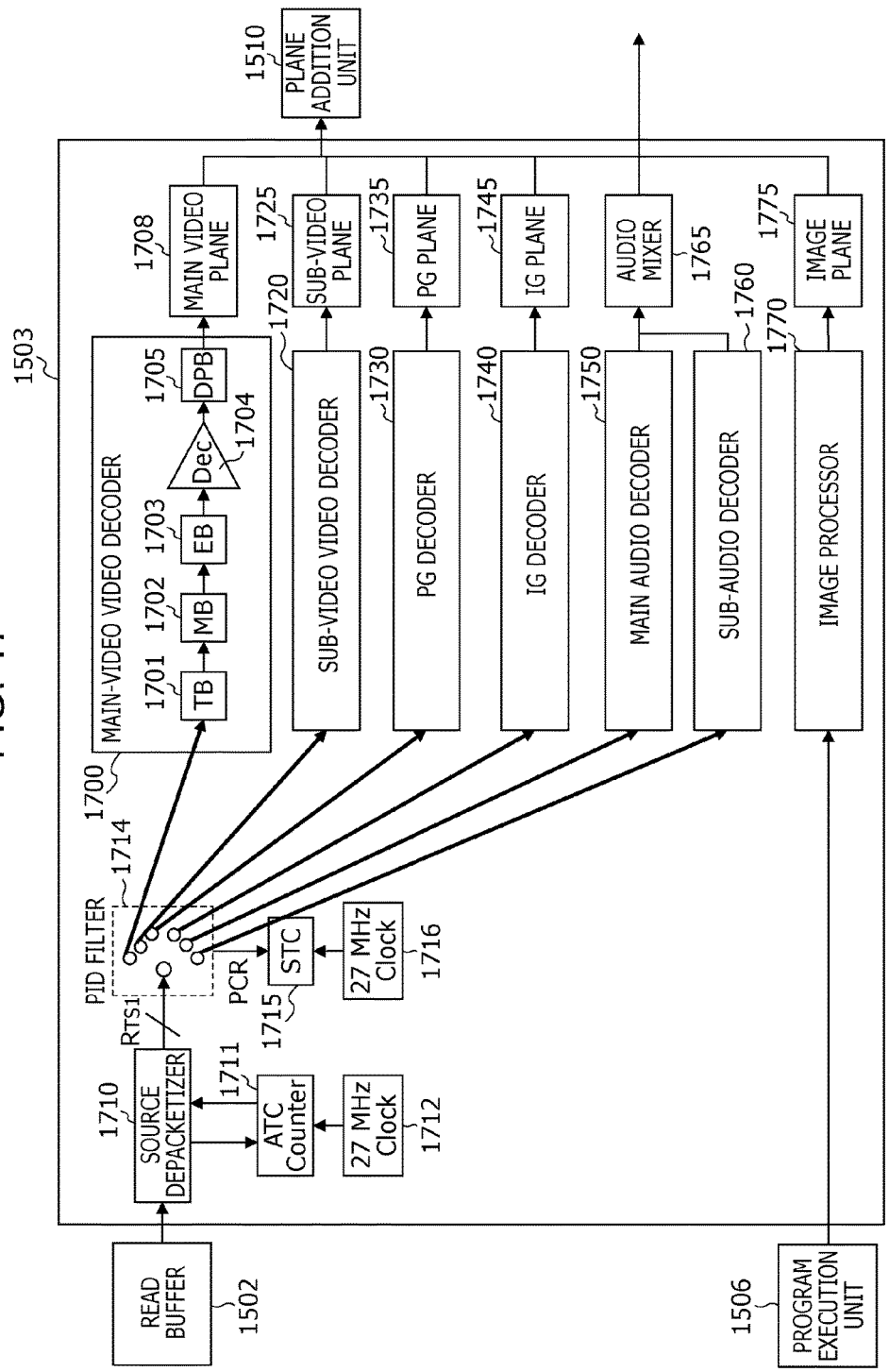
FIG. 17 is a diagram illustrating details of the inner configuration of a system target decoder of the playback device.

Next, the system target decoder 1503 will be described with reference to FIG. 17. FIG. 17 is a diagram illustrating the details of the inner configuration of the system target decoder.

A clock 1712 supplies a clock signal of a frequency of 27 MHz, for example, to an ATC counter 1711. The ATC counter 1711 generates ATC values based on clock signals supplied from the clock 1712.

A source depacketizer 1710 interprets source packets transferred to the system target decoder 1503, extracts TS packets and sends to the PID filter. At the time of this sending, the source depacketizer 1710 adjusts the input time to the decoder in accordance with the ATS of each source packet. Specifically, at the instant that the value of the ATC generated by the ATC counter 1711 and the ATS value of the source packet are the same, the source depacketizer 1710 transfers just that TS packet to the PID filter in accordance with the recording rate of the AV clip.

Of the TS packets output from the source depacketizer 1710, the PID filter 1714 transfers those where the PID of the TS packet matches the PID that is necessary for playback, to a main-video video recorder 1700, a sub-video video decoder 1720, an IG decoder 1740, a PG decoder 1730, a main audio decoder 1750, and a sub-audio decoder 1760, in accordance with PID. For example, in the case of BD-ROM, the PID filter transfers to the main-video video recorder 1700 in a case where the PID included in the TS packet is 0x1011, to the sub-video video decoder 1720 in a case where the PID is from 0x1B00 to 0x1B1F, to the main audio decoder 1750 in a case where the PID is from 0x1100 to 0x111F, to the sub-audio decoder 1760 in a case where the PID is from 0x1A00 to 0x1A1F, to the PG decoder 1730 in a case where the PID is from 0x1200 to 0x121F, and to the IG decoder 1740 in a case where the PID is from 0x1400 to 0x141F.

A clock 1716 supplies a clock signal of a frequency of 27 MHz, for example, to an STC 1715. The STC 1715 stores System Time Clock (STC), which is the temporal axis of time (PTS and DTS) relating to the decoding by the above-described corresponding decoder, based on clock signals supplied from the clock 1716. When the PID of the TS packet matches the PID of the PCR, the STC 1715 is supplied from the PID filter 1714 with information of SRC time included in the PCR, whereupon synchronization with ATC time is realized. The above-described corresponding decoder controls the decoding by referencing the STC time stored by the STC 1715.

The main-video video decoder 1700 is made up of a Transport Stream Buffer (TB) 1701, Multiplexing Buffer (MB) 1702, Elementary Stream Buffer (EB) 1703, compressed video decoder 1704, and Decoded Picture Buffer (DPB) 1705.

The TB 1701 is a buffer that temporarily stores a TS packet without change, when a TS packet including a video stream is output from the PID filter.

The MB 1702 is a buffer that temporarily stores PES packets when the TB 1701 outputs a video stream to the EB 1703. The TS header of the TS packet is removed when transferring data from the TB 1701 to the MB 1702.

The EB 1703 is a buffer storing pictures in an encoded state (I pictures, B pictures, and P pictures) The PES header is removed when data is transferred from the MB 1702 to the EB 1703.

The compressed video decoder 1704 creates a frame/field images by decoding individual video access units in video elementary streams following predetermined decoding time (DTS). Compression encoding formats of video streams multiplexed on AV clips include MEPG2, MPEG4 AVC, VC1, and so forth, so the decoding method of the compressed video decoder 1704 is switched in accordance with the stream attributes. The compressed video decoder 1704 transfers the decoded frame/field images to the DPB 1705, and writes frame/field images corresponding to the timing of display time (PTS) to the main video plane 1708.

The DPB 1705 is a buffer that temporarily stores decoded frame/field images. The DPB 1705 is a buffer used to reference already-decoded pictures when the compressed video decoder 1704 decodes, for each video access unit, P pictures, B pictures, and the like, that have been subjected to inter-picture prediction encoding.

The sub-video video decoder 1720 has the same configuration as the main-video video recorder 1700, and decodes input sub-video video streams and writes pictures to the sub-video plane 1725 at the timing of the display time (PTS).

The PG decoder 1730 extracts and decodes presentation graphics streams from TS packets input from the source depacketizer 1710, and writes non-compressed graphics data to the PG plane 1735 at the timing of the display time (PTS).

The IG decoder 1740 extracts and decodes interactive graphics streams from TS packets input from the source depacketizer 1710, and writes non-compressed graphics data to the IG plane 1745 at the timing of the display time (PTS).

The main audio decoder 1750 has a buffering buffer, and obtains non-compressed linear pulse-code modulation (LPCM) state audio data by removing information such as TS headers and PES headers while storing data in the buffer, and performing decoding processing of the audio stream. The main audio decoder outputs the obtained audio data to an audio mixer 1765 at the timing of the display time (PTS). There are compression encoding formats such as AC3, DTS, and so forth for the audio stream multiplexed on the AV clip, so the main audio decoder switches the decoding format of the compressed audio in accordance with stream attributes and performs decoding processing.

The sub-audio decoder 1760 has the same configuration as the main audio decoder 1750, and outputs, to the audio mixer 1765, non-compressed LPCM-state audio data obtained by performing decoding processing of the input sub-audio stream at the timing of the display time. There are compression encoding formats such as Dolby Digital Plus, DTS-HD LBR, and so forth for the audio stream multiplexed on the AV clip, so the sub-audio decoder 1760 switches the decoding format of the compressed audio in accordance with stream attributes and performs decoding processing.

The audio mixer 1765 mixes (overlays sounds) of the non-compressed audio data output from the main audio decoder and the non-compressed audio data output from the sub-audio decoder, and outputs to the speakers or the like.

An image processor 1770 decodes graphics data (PNG/JPEG) transferred from the program execution unit 1506, and outputs to the image plane 1775 following the display time specified by the program execution unit 1506. The above has been a description of the configuration of the 2D playback device according to the present disclosure.

Playback of Data Including HDR Video

Figure 18B:
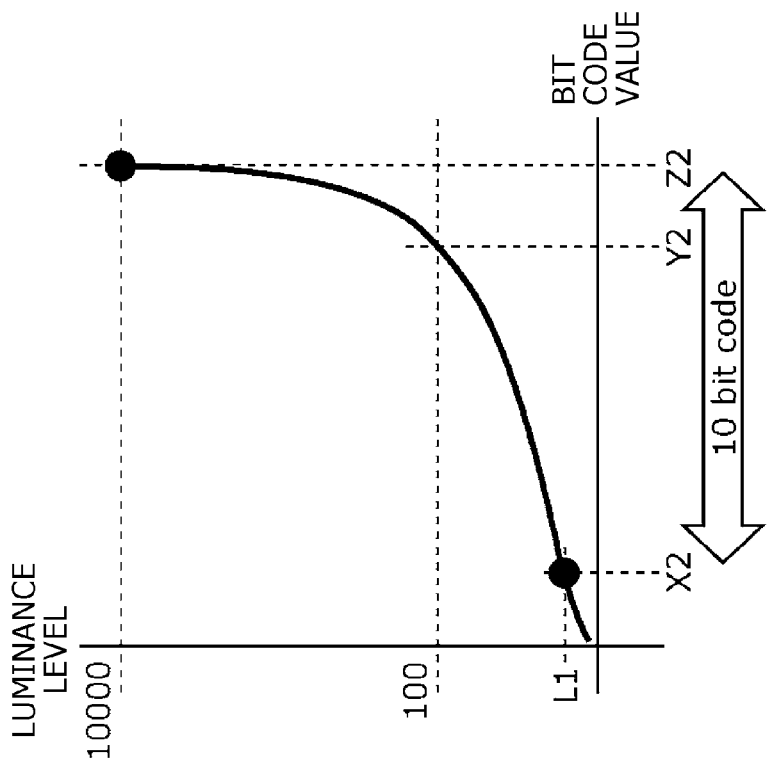
FIGS. 18A and 18B are diagrams illustrating the relationship between standard dynamic range and high dynamic range for luminance level.
Figure 18A:
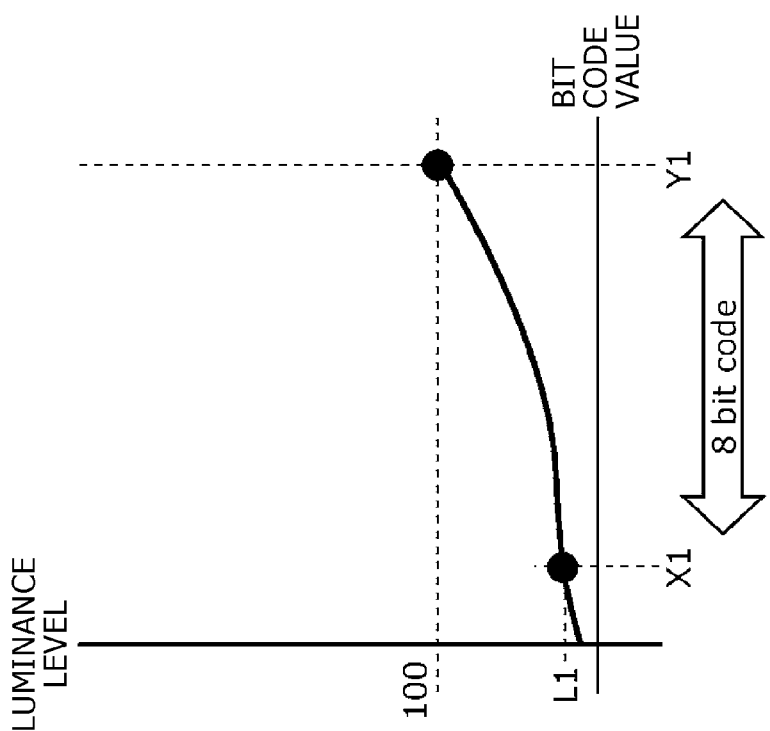

Next, high dynamic range of video contents will be described with reference to FIGS. 18A and 18B. FIGS. 18A and 18B are diagrams illustrating the relationship between standard dynamic range and high dynamic range of luminance level.

In conventional video data, each pixel in a picture is expressed by 8-bit luminance information and 8-bit×2 color information. Particularly, the luminance information is information correlated with luminance level that display devices such as light-emitting diode (LED) displays and plasma displays can emit, and the correlation illustrated in FIG. 18A indicates the relationship of 8-bit bit code values and luminance levels having been correlated. The luminance information of each pixel in decoded video signals is converted into luminance level at the display device by the luminance signal conversion relationship (electro-optical transfer function (EOTF)) in FIG. 18A, and light is emitted. Conventionally, due to standard light-emission capabilities of conventional display devices, EOTF correlates luminance levels and 8-bit bit code value signals in a luminance level range where the upper limit of the luminance level is 100 nit. Video contents expressed by the EOTF illustrated in FIG. 18A are called standard dynamic range (SDR) video.

In comparison with this, advance in the light-emission capabilities of display devices has enabled light emission to high levels of luminance levels beyond 100 nit, and video can be displayed at broader luminance levels in the high luminance region as compared to the conventional. Accordingly, an EOTF has been proposed where luminance level and 10-bit bit code value signals are correlated in a broad luminance level range that reaches a higher luminance level than in FIG. 18A, such as the EOTF illustrated in FIG. 18B (e.g., 10,000 nit). Video contents expressed by the EOTF illustrated in FIG. 18B are called high dynamic range (HDR) video.

The EOTF corresponding to HDR video (hereinafter referred to as "EOTF for HDR") is not singularly restricted to the curve illustrated in FIG. 18B, and may differ in accordance with the upper limit value of the luminance level, the length of the bit code value allocated, the conversion format, and so forth. That is to say, various shapes exist for the curve of the EOTF for HDR.

For example, in the EOTF corresponding to SDR video (hereinafter referred to as "EOTF for SDR") illustrated in FIG. 18A, luminance level 1 through 100 is correlated with bit code values X1 through Y1, in a one-on-one manner. On the other hand, assuming an arrangement in the EOTF for HDR illustrated in FIG. 18B where luminance level 1 through 100 is correlated with bit code values X2 through Y2, in a one-on-one manner, if the curve of the EOTF from HDR X2 to Y 2 is the same as the EOTF for SDR, the HDR video contents expressed by the EOTF for HDR illustrated in FIG. 18B can be input to a display having SDR video display capabilities and displayed as SDR video without being converted. Accordingly, video contents drawn by the EOTF for HDR obtained by extending the high luminance level information of the EOTF for SDR is SDR video that can be displayed in HDR, and thus will be referred to as HDR-compatible SDR video. Flag Indicating Presence/Absence of HDR Video Stream Now, a case will be considered where the playback device reads out and plays data including a video stream recorded in a recording medium (e.g., BD). One or more video stream is recorded in the recording medium. This one or more video stream includes, for example, at least one of an HDR stream corresponding to HDR (HDR video stream) and an SDR stream corresponding to SDR (SDR video stream). The recording medium also has recorded therein a playlist file, as described above.

A playlist file includes identification information indicating what sort of video stream is or is not included in the AV clip to be played, when playing an AV clip recorded in a recording medium (e.g., BD). The identification information specifically indicates whether or not an HDR stream is included in the one or more video streams recorded in the recording medium. The identification information may also indicate whether or not an SDR stream is included in the one or more video streams recorded in the recording medium. Also, the identification information may indicate whether or not an HDR video stream corresponding to HDR1 video (see later description) is included in the one or more video streams recorded in the recording medium, may indicate whether or not an HDR video stream corresponding to HDR2 video (see later description) is included in the one or more video streams recorded in the recording medium, may indicate whether or not an HDR video stream corresponding to HDR3 video (see later description) is included in the one or more video streams recorded in the recording medium, may indicate whether or not an SDR video stream corresponding to SDR1 video (see later description) is included in the one or more video streams recorded in the recording medium, and may indicate whether or not an SDR video stream corresponding to SDR2 video (see later description) is included in the one or more video streams recorded in the recording medium. It is sufficient for the identification information to be recorded in the recording medium, and does not have to be included in the playlist file.

Figure 19:
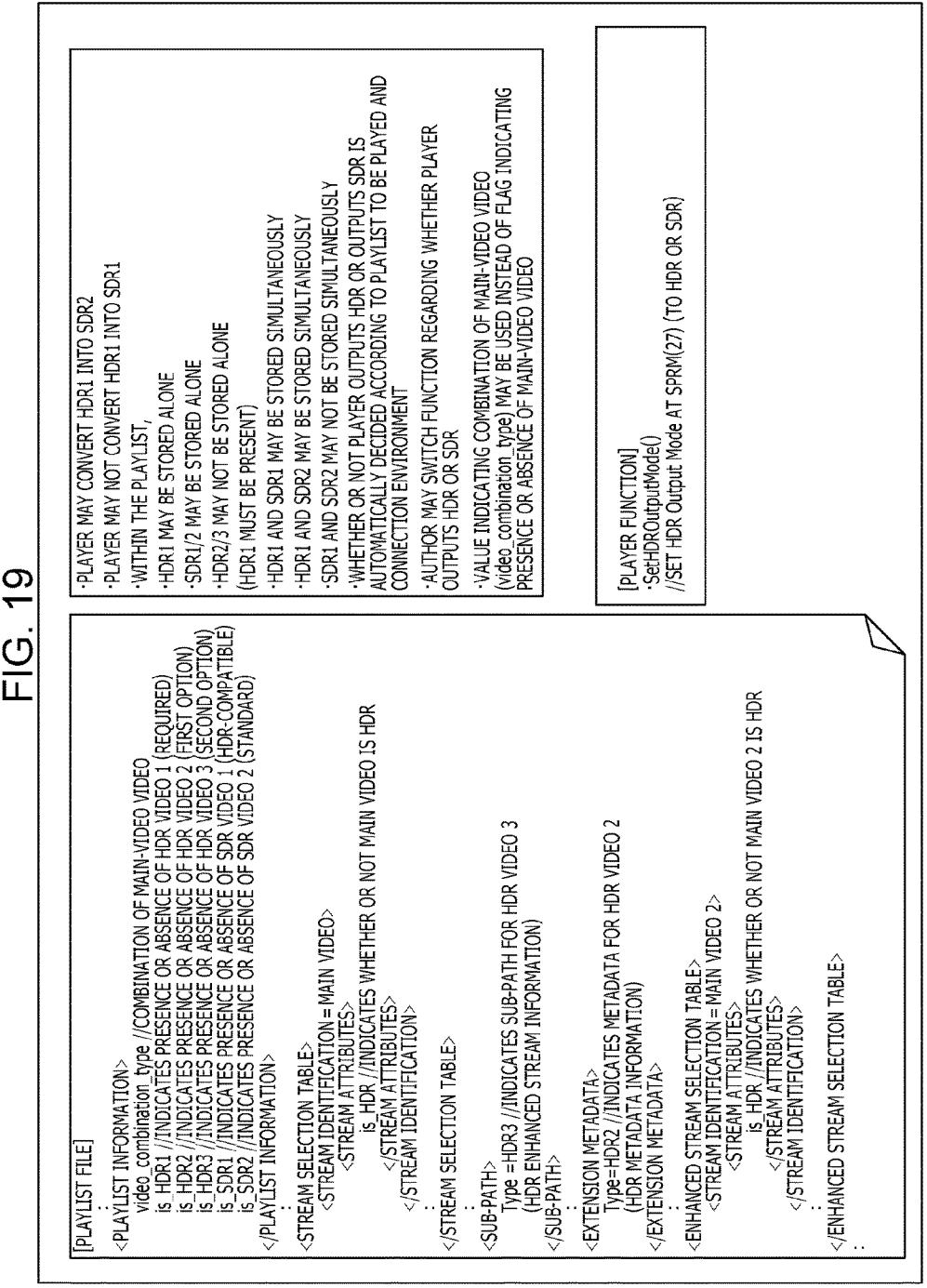
FIG. 19 is a diagram illustrating details of the data configuration of a playlist file.

FIG. 19 is a diagram illustrating the data configuration of a playlist file in detail. There are is_HDR1, is_HDR2, is_HDR3, is_SDR1, and is_SDR2, as identification information indicating whether or not a video stream that is the main video exists in playlist information in a playlist, as illustrated in FIG. 19.

is_HDR1 is identification information indicating whether or not there exists an HDR video stream corresponding to HDR video 1 that uses a required HDR technology in the playlist.

is_HDR2 is identification information indicating whether or not there exists an HDR video stream corresponding to HDR video 2 that uses a first optional HDR technology (first HDR technology) in the playlist.

is_HDR3 is identification information indicating whether or not there exists an HDR video stream corresponding to HDR video 3 that uses a second optional HDR technology (second HDR technology) that differs from the first optional HDR technology.

is_SDR1 is identification information indicating whether or not there exists a video stream of HDR-compatible SDR video (SDR1 video).

is_SDR2 is identification information indicating whether or not there exists a video stream of HDR-incompatible SDR video (SDR2 video).

One or more main video streams can be included in a playlist. Accordingly, information indicating combination of main video streams included in the playlist (video_combination_type) may be recorded separately from the above-described identification information indicating whether or not existing.

There may be cases where main video streams that can exist in the playlist are restricted to several patterns, from the nature of the technology being used. As one example, restriction may be to a pattern satisfying the following two constraints.

(1) An HDR video stream using the first or second optional HDR technology also needs the required HDR video stream to play this HDR video stream. Accordingly, this HDR video stream does not exist alone, and always must have an HDR video stream of the required HDR technology.

(2) It is sufficient for an SDR video stream to have one or the other of an HDR-compatible SDR video stream and HDR-incompatible SDR video stream. Accordingly, a playlist cannot include both of these SDR video streams.

In a case where there is the above constraint, restriction is made to the 14 combination patterns illustrated in FIG. 20. FIG. 20 is a diagram illustrating combination patterns of main video within a playlist.

The playback device decides a main video stream to be played back from the one or more main video streams included in the playlist, in accordance with the playback capabilities of the playback device itself, and the display capabilities of the display device connected to the playback device. Note that the one or more main video streams each are video streams of the same video content. The playback device acquires the playback capability information indicating playback capabilities of the playback device, and display capability information indicating display capabilities of the display device, in order to decide the main video stream to play, and saves in the player variables 1508.

SPRM(25) is playback capability information indicating playback capabilities of the playback device. SPRM(25) stores information indicating whether or not the playback device can decode an HDR video stream using the necessary HDR technology, information indicating whether or not the playback device can decode an HDR video stream using the first optional HDR technology, and information indicating whether or not the playback device can decode an HDR video stream using the second optional HDR technology. SPRM(25) also stores information indicating whether or not the playback device can perform HDR conversion so that graphics data drawn using SDR technology can be displayed overlaid on an HDR video stream.

SPRM(26) is display capability information indicating display capabilities of the display device. SPRM(26) stores information indicating whether or not the display device connected to the playback device can display an HDR video stream using HDR technology as HDR video. SPRM(26) stores information indicating whether or not the display device connected to the playback device can display an HDR video stream using the necessary HDR technology, information indicating whether or not the display device can display an HDR video stream using the first optional HDR technology, and information indicating whether or not the display device can display an HDR video stream using the second optional HDR technology.

FIGS. 21A through 21C are diagrams illustrating data configuration examples in a case where only one main video stream exists in a playlist. FIG. 21A is a diagram illustrating a data configuration example in a case where only a main video stream of HDR video exists. In the playlist information, is_HDR1 shows "1", so determination can be made that the required HDR main video stream exists as the main video stream recorded in the recording medium. The fact that is_HDR1 is "1" also indicates that a main video is registered in the stream selection table. The stream attribute information of the main video also includes is_HDR that indicates whether or not the main video is HDR video. This is_HDR indicates "1", so it can be determined that the main video stream is HDR video.

FIG. 21B is a diagram illustrating a data configuration example in a case where only a main video stream of HDR-compatible SDR exists in the playlist. In the playlist information, is_SDR1 shows "1", so determination can be made that HDR-compatible SDR video exists as the main video stream recorded in the recording medium. The fact that is_SDR1 is "1" also indicates that a main video is registered in the stream selection table. The stream attribute information of the main video also includes is_HDR that indicates whether or not the main video is HDR video. This is_HDR indicates "0", so it can be determined that the main video stream is SDR video.

FIG. 21C is a diagram illustrating a data configuration example in a case where only a main video stream of HDR-incompatible SDR exists in the playlist. In the playlist information, is_SDR2 shows "1", so determination can be made that HDR-incompatible SDR video exists as the main video stream recorded in the recording medium. The fact that is_SDR2 is "1" also indicates that a main video is registered in the stream selection table. The stream attribute information of the main video also includes is_HDR that indicates whether or not the main video is HDR video. This is_HDR indicates "0", so it can be determined that the main video stream is SDR video.

FIGS. 21D and 21E are diagrams illustrating data configuration examples in a case where multiple HDR main video streams exists in a playlist. FIG. 21D is a diagram illustrating a data configuration example in a case where a required HDR main video stream and a first optional HDR main video stream exist in the playlist. The is_HDR1 existing in the playlist information shows "1", so determination can be made that the required HDR main video stream exists as the main video stream recorded in the recording medium. The fact that is_HDR1 is "1" also indicates that a main video is registered in the stream selection table. The stream attribute information of the main video also includes is_HDR that indicates whether or not the main video is HDR video. This is_HDR indicates "1", so it can be determined that the main video stream is HDR video.

Also, the is_HDR2 existing in the playlist information shows "1", so determination can be made that the first optional HDR main video stream exists. The fact that is_HDR2 is "1" also indicates that extension metadata necessary to extend the main video registered in the stream selection table into HDR video is recorded. The extension metadata includes Type information indicating the type, the Type information indicating HDR video 2.

FIG. 21E is a diagram illustrating a data configuration example in a case where a required HDR main video stream and a second optional HDR main video stream exist in the playlist. The is_HDR1 existing in the playlist information shows "1", so determination can be made that the required HDR main video stream exists as the main video stream recorded in the recording medium. The fact that is_HDR1 is "1" also indicates that a main video is registered in the stream selection table. The stream attribute information of the main video also includes is_HDR that indicates whether or not the main video is HDR video. This is_HDR indicates "1", so it can be determined that the main video stream is HDR video.

Also, the is_HDR3 existing in the playlist information shows "1", so determination can be made that the second optional HDR main video stream exists. The fact that is_HDR3 is "1" also indicates that an extension stream necessary to extend the main video registered in the stream selection table into HDR video is recorded at a sub-path. The sub-path includes Type information indicating the type of sub-path, the Type information indicating an extension stream for HDR video 3.

FIGS. 21F and 21G are diagrams illustrating data configuration examples in a case where an HDR main video stream and an SDR main video stream exist in a playlist. FIG. 21F is a diagram illustrating a data configuration example in a case where a required HDR main video stream and an HDR-compatible SDR main video stream exist in the playlist. The is_HDR1 existing in the playlist information shows "1", so determination can be made that the required HDR main video stream exists as the main video stream recorded in the recording medium. The fact that is_HDR1 is "1" also indicates that a main video is registered in the stream selection table. The stream attribute information of the main video also includes is_HDR that indicates whether or not the main video is HDR video. This is_HDR indicates "1", so it can be determined that the main video stream is HDR1 video.

On the other hand, the is_SDR1 existing in the playlist information shows "1", so determination can be made that HDR-compatible SDR video exists as the main video stream recorded in the recording medium. The HDR-compatible SDR video is registered in an enhanced stream selection table as main video 2 video. The stream attribute information of the main video 2 video also includes is_HDR that indicates whether or not the main video 2 video is HDR video. This is_HDR indicates "0", so it can be determined that the main video stream 2 is SDR video.

FIG. 21G is a diagram illustrating a data configuration example in a case where a required HDR main video stream and an HDR-incompatible SDR main video stream exist in the playlist. The is_HDR1 existing in the playlist information shows "1", so determination can be made that the required HDR main video stream exists as the main video stream recorded in the recording medium. The fact that is_HDR1 is "1" also indicates that a main video is registered in the stream selection table. The stream attribute information of the main video also includes is_HDR that indicates whether or not the main video is HDR video. This is_HDR indicates "1", so it can be determined that the main video stream 1 is HDR video.

On the other hand, the is_SDR2 existing in the playlist information shows "1", so determination can be made that HDR-incompatible SDR video exists as the main video stream recorded in the recording medium. The HDR-incompatible SDR video is registered in the enhanced stream selection table as main video 2 video. The stream attribute information of the main video 2 video also includes is_HDR that indicates whether or not the main video 2 video is HDR video. This is_HDR indicates "0", so it can be determined that the main video stream 2 is SDR video.

Main Video Stream Selection Method—HDMV

The playback control unit 1507 selects (decides) a main video stream to play out of the main video streams included in the playlist read out from the recording medium, in accordance with the playback capabilities of the playback device and the display capabilities of the display device.

Figure 22:
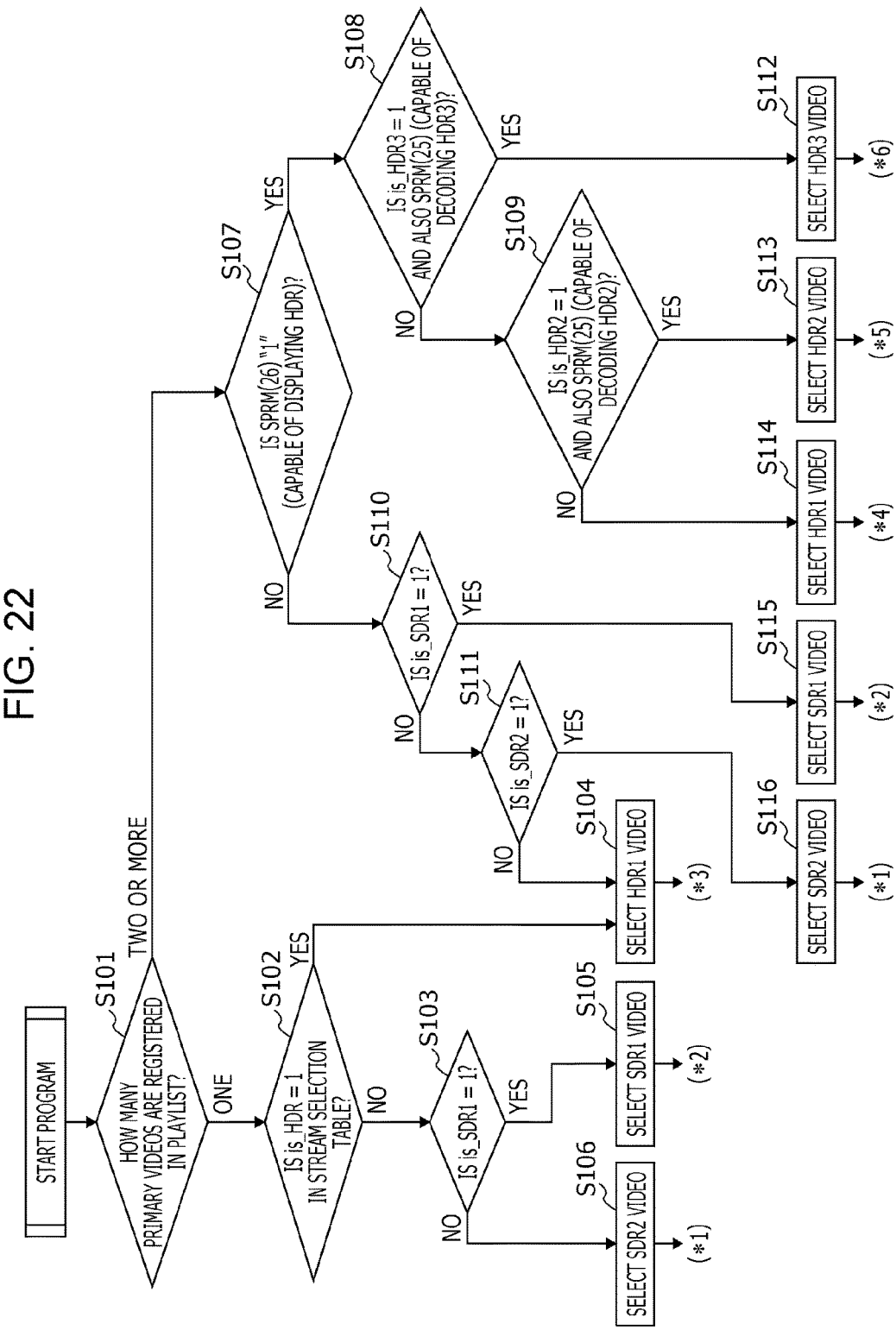
FIG. 22 is a flowchart illustrating a selection (deciding) method of a main video stream to play, in a case of AV playback mode.

FIG. 22 is a flowchart illustrating a method of selecting (deciding) a main video steam to play in the case of AV playback mode. Note that FIG. 22 is a flowchart regarding a case where graphics are configured by HDMV.

First, upon reading the playlist from the recording medium, the playback control unit 1507 determines how many main video streams existing in the playlist have been registered (S101). Specifically, the playback control unit 1507 determines the number of main video streams in the playlist by determining whether or not each type of main video stream is present/absent, from the values of is_HDR1, is_HDR2, is_HDR3, is_SDR1, and is_SDR2, in the playlist information.

In a case of having determined that the number of main video streams registered in the playlist is only one ("ONE" in S101), the playback control unit 1507 selects (decides) the only main video stream that is registered as the video stream to be played, and determination is made regarding whether or not the is_HDR1 in the playlist is "1" (S102). That is to say, in step S102, determination is made regarding whether or not an SDR video stream is the only one registered in the playlist.

In a case where determination is made that is_HDR1 is "1" (Yes in S102), the playback control unit 1507 selects the HDR1 video as the video stream to play (S104). Note that in this case, identification can be made that there is one main video stream and that this is an HDR video stream, so determination can be made that the main video stream is HDR1 video that is the required HDR.

In a case of having determined that is_HDR1 is "0" (NO in S102), the playback control unit 1507 determines whether or not is_SDR1 is "1" (S103).

In a case of having determined that is_SDR1 is "1" (Yes in S103), the playback control unit 1507 selects SDR1 video as the video stream to play (S105). Note that in this case, is_SDR1 is "1", so determination can be made that the main video is HDR-compatible SDR video.

In a case of having determined that is_SDR1 is "0" (No in S103), the playback control unit 1507 selects SDR2 video as the video stream to play (S106). Note that in this case, the number of main video streams is one, and is_HDR1 is "0", and also is_SDR1 is "0", so determination can be made that the main video is HDR-incompatible SDR video.

An SDR video stream is selected in step S105 and step S106, since determination is made in step S102 that only an SDR video stream is registered in the playlist.

In a case of having determined that the number of main video streams registered in the playlist is two or more ("TWO OR MORE" in S101), the playback control unit 1507 determines whether or not the display device connected to the playback device can display HDR video (S107). Specifically, the playback control unit 1507 determines whether or not the SPRM(26) held as player variables 1508 is "1". In a case of having determined that SPRM(26) is "1", the playback control unit 1507 can determine that the display device can display HDR video, and in a case of having determined that SPRM(26) is "0", can determine that the display device cannot display HDR video. After ending the determination in step S107, the playback control unit 1507 checks main video streams existing in the playlist.

Now, in a case where there are multiple HDR videos, and the display device is capable of displaying HDR video, the playback device preferably selects with higher priority an HDR video with high definition out of the playable and displayable HDR videos, and plays the selected HDR video. A case will be considered where how high definition the HDR video is, is in the order of HDR video 3, HDR video 2, and HDR video 1. In the present embodiment, in a case where determination is made that there are multiple HDR videos, whether playable and displayable or not is determined in the order of HDR video 3 and HDR video 2, and the first HDR video that is determined to be playable and displayable is selected, but the selection method is not restricted to this. That is to say, in the selection of the main video stream to be played, in a case where there are two or more video streams that can be played at the playback device and displayed at the display device, a video stream that has a higher predetermined priority of the two or more video streams may be selected.

In a case of having determined that the display device connected to the playback device can display HDR video (Yes in S107), the playback control unit 1507 determines whether or not there is HDR video 3 in the playlist and also the playback device has capabilities of playing the HDR video 3 (S108). Specifically, the playback control unit 1507 determines whether is_HDR3 is "1" and SPRM(25) shows "capable of decoding SDR video 3".

In a case of having determined that HDR video 3 exists within the playlist and that the playback device has capabilities of playing the HDR video 3 (Yes in S108), the playback control unit 1507 selects the HDR3 video as the video stream to play (S112).

In a case of having determined that HDR video 3 does not exist within the playlist, or that the playback device does not have capabilities of playing the HDR video 3 (No in S108), the playback control unit 1507 determines whether or not there is HDR video 2 in the playlist and also the playback device has capabilities of playing the HDR video 2 (S109). Specifically, the playback control unit 1507 determines whether is_HDR2 is "1" and SPRM(25) shows "capable of decoding HDR2 video".

In a case of having determined that HDR2 video exists in the playlist, and that the playback device has capabilities of playing the HDR video 2 (Yes in S109), the playback control unit 1507 selects the HDR2 video as the video stream to be played (S113).

In step S112 and step S113, determination has been performed in the order of step S108 and S109 and the HDR video stream satisfying these determinations have been selected as the video stream to play, so of the HDR video streams satisfying the playback capabilities of the playback device and the display capabilities of the display device, the HDR video stream with the highest predetermined priority is selected.

In a case of having determined that HDR video 2 does not exist within the playlist, or that the playback device does not have capabilities of playing the HDR video 2 (No in S109), the playback control unit 1507 selects HDR1 video, which is required HDR video, as the video stream to play (S114).

In step S107, in a case of having determined that the display device connected to the playback device cannot display HDR video (NO in S107), the playback control unit 1507 determines whether or not there is an SDR video stream that exists in the playlist (S110). Specifically, the playback control unit 1507 determines whether or not is_SDR1 is "1".

In a case of having determined that is_SDR1 is "1" (Yes in S110), the playback control unit 1507 selects the SDR1 video as the video stream to play (S115). Note that in this case, is_SDR1 is "1" the same as described above, so determination can be made that the main video is HDR-compatible SDR video.

In a case where determination is made that is_SDR1 is not "1" but "0" (NO in S110), the playback control unit 1507 determines whether is_SDR2 is "1" (S111). In this case, is_SDR2 is "1", so determination can be made that the main video is HDR-incompatible SDR video.

In a case of determining that is_SDR2 is "1" (Yes in S111), the playback control unit 1507 selects SDR2 video as the video stream to play.

In a case where determination is made that is_SDR2 is not "1" but "0" (NO in S111), the playback control unit 1507 determines that neither SDR1 video nor SDR2 video exist. That is to say, no SDR video exists, so in this case the required HDR1 video is selected as the video stream to play (S116).

Main Video Stream Selection Method—BD-J

Figure 23:
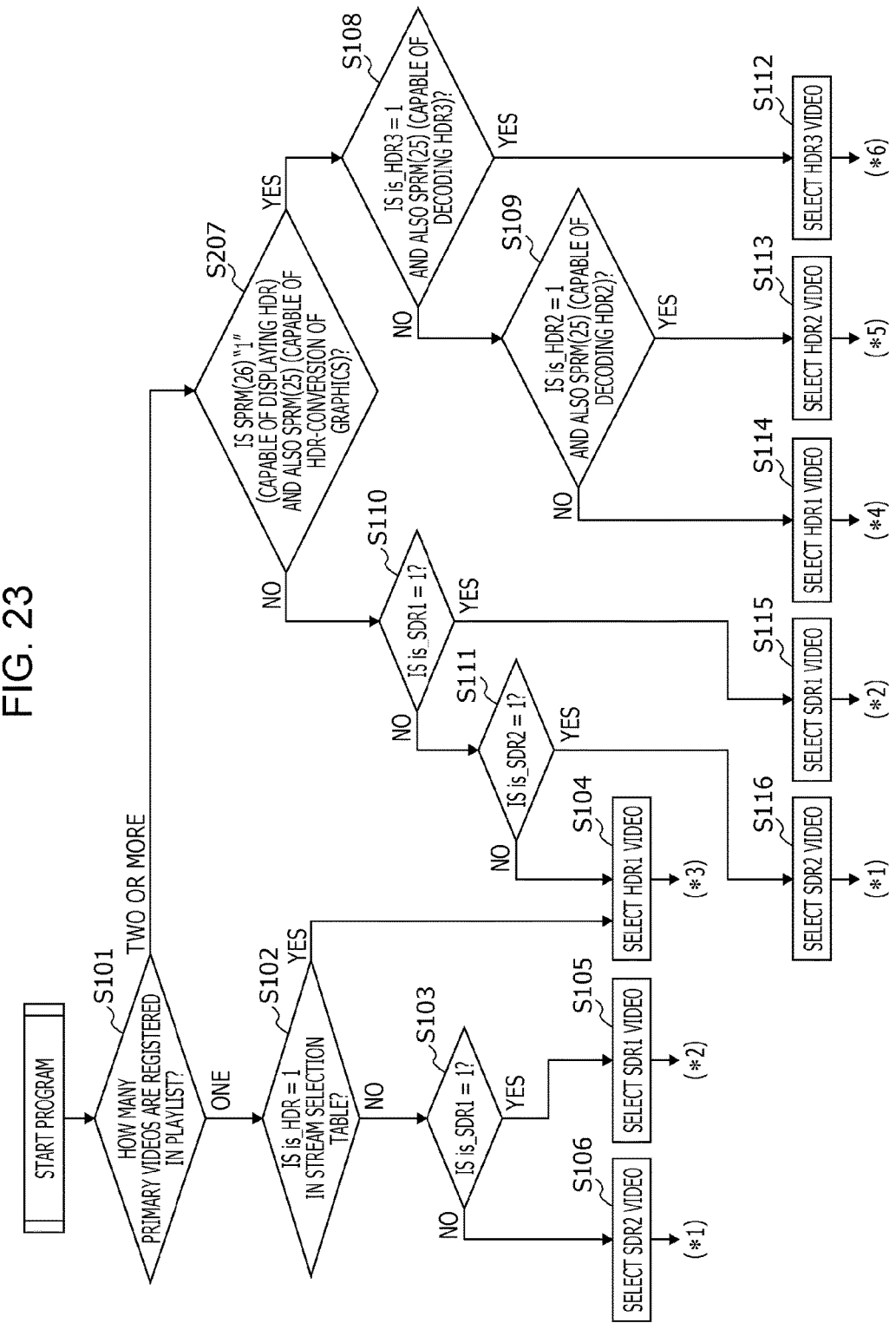
FIG. 23 is a flowchart illustrating a selection method of a main video stream to play, in a case of program playback mode.

FIG. 23 is a flowchart illustrating a method of selecting (deciding) the main video stream to play in a case of program playback mode. In the program playback mode, only the determination in S107 differs in comparison to the case of the AV playback mode in FIG. 22, with step S207 being performed instead of step S107. Specifically, in step S207, in a case where there are two or more main video streams existing in the playlist ("TWO OR MORE" in S101), the playback control unit 1507 determines whether or not the display device connected to the playback device is capable of displaying HDR video, and the playback device is capable of converting graphics form SDR to HDR. In a case that the determination in step S207 is Yes, the flow transitions to step S108, while in a case that the determination in step S207 is No, the flow transitions to step S110. Other steps are the same as in the flowchart of the case of AV playback mode in FIG. 22, so description will be omitted.

Method of Display on Display Device

The playback device decodes (plays) the main video stream selected by the selection method illustrated in FIG. 22 or FIG. 23, and outputs the playback signals indicating the video obtained by the decoding (playing) to the display device connected to the playback device. The display device then displays the main video stream output from the playback device.

Figure 24:
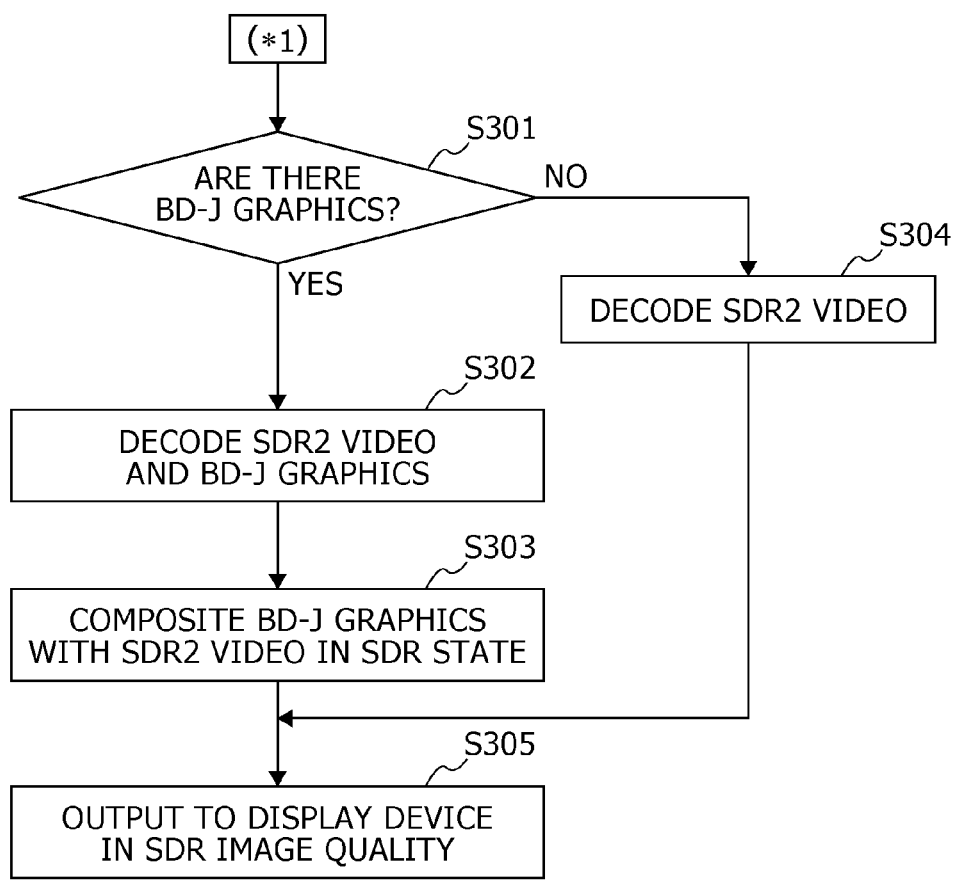
FIG. 24 is a flowchart illustrating an example of an output method of outputting video including SDR2 video to a display device, in a case where SDR2 video has been selected.

FIGS. 24 through 29 are flowcharts illustrating the processing up to the main video streams selected by the above-described selection methods being output to the display device. FIG. 24 is a flowchart illustrating an example of an output method in a case where SDR2 video has been selected, to output video including the SDR2 video to the display device.

As illustrated in FIG. 24, in a case where HDR-incompatible SDR2 video has been selected by step S106 or step S116 having been performed (*1) in FIG. 22 or FIG. 23, the playback device determines whether or not there are BD-J graphics to be displayed at the time of playing the SDR2 video (S301). BD-J graphics are graphics data (PNG/JPEG) stored in the image plane 1775 illustrated in FIG. 17, for example. The graphics data (PNG/JPEG) stored in the image plane 1775 is output from the image processor 1770, for example.

The image processor 1770 decodes the graphics data (PNG/JPEG) transferred from the program execution unit 1506 that executes a Java (registered trademark) corresponding to the BD program, for example, and outputs the decoded graphics data (PNG/JPEG) to the image plane 1775 in accordance with the display time specified by the program execution unit 1506.

A program generating graphics data may be included in the Java (registered trademark) corresponding to the BD program. In this case, the generated graphics data may be transferred from the program execution unit 1506 that executes the BD program to the image processor 1770, with the image processor outputting the transferred graphics data to the image plane 1775.

In a case where determination is made that there are BD-J graphics to be displayed when playing the SDR2 video (Yes in S301), the playback device decodes the SDR2 video and the BD-J graphics (S302).

The playback device composites (superimposes) the video of the SDR2 video and the video of the BD-J graphics, obtained by decoding, in SDR image quality (S303).

On the other hand, in a case where determination is made that there are no BD-J graphics to display at the time of playing the SDR2 video (No in S301), the playback device decodes the SDR2 video (S304).

The playback device outputs playback signals showing the SDR image quality video obtained by the compositing, or the video of SDR2 video obtained by the decoding, on the display device (S305).

Figure 25:
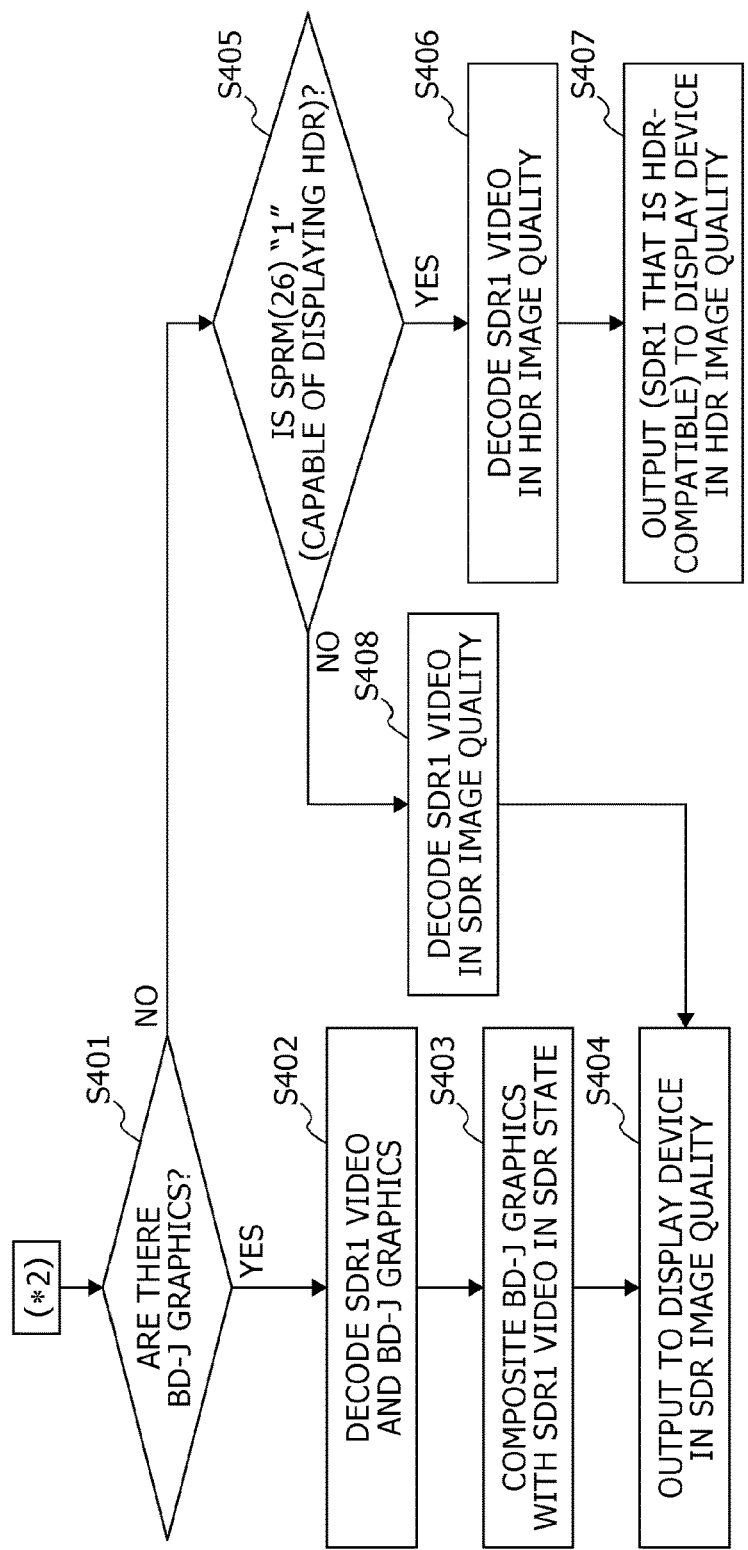
FIG. 25 is a flowchart illustrating an example of an output method of outputting video including SDR1 video to a display device, in a case where SDR1 video has been selected.

FIG. 25 is a flowchart illustrating an example of an output method in a case where SDR1 video has been selected, to output video including the SDR1 video to the display device. As illustrated in FIG. 25, in a case where HDR-incompatible SDR1 video has been selected by step S105 or step S115 having been performed (*2) in FIG. 22 or FIG. 23, the playback device determines whether or not there are BD-J graphics to be displayed at the time of playing the SDR1 video (S401).

In a case where determination is made that there are BD-J graphics to be displayed when playing the SDR1 video (Yes in S401), the playback device decodes the SDR1 video and the BD-J graphics (S402).

The playback device composites (superimposes) the video of the SDR1 video and the video of the BD-J graphics, obtained by decoding, in SDR image quality (S403).

The playback device outputs the playback signals showing the SDR image quality video obtained by the compositing on the display device (S404). Also in step S404, the playback device outputs playback signals showing the SDR image quality video obtained by decoding in later-described step S408, on the display device.

On the other hand, in a case where determination is made that there are no BD-J graphics to display at the time of playing the SDR1 video (No in S401), the playback device determines whether or not the display device is capable of HDR display (S405). Specifically, in this case, the playback device determines whether or not SPRM(26) is "1".

In a case where determination is made that the display device is capable of HDR display (Yes in S405), the playback device decodes the SDR1 video in HDR image quality, since the SDR1 video is HDR-compatible (S406).

The playback device outputs the playback signals showing the video of the SDR1 video obtained by the decoding in S406 (S407).

On the other hand, in a case where determination is made that the display device is not capable of HDR display (No in S405), the playback device decodes the SDR1 video in SDR image quality (S408).

Figure 26:
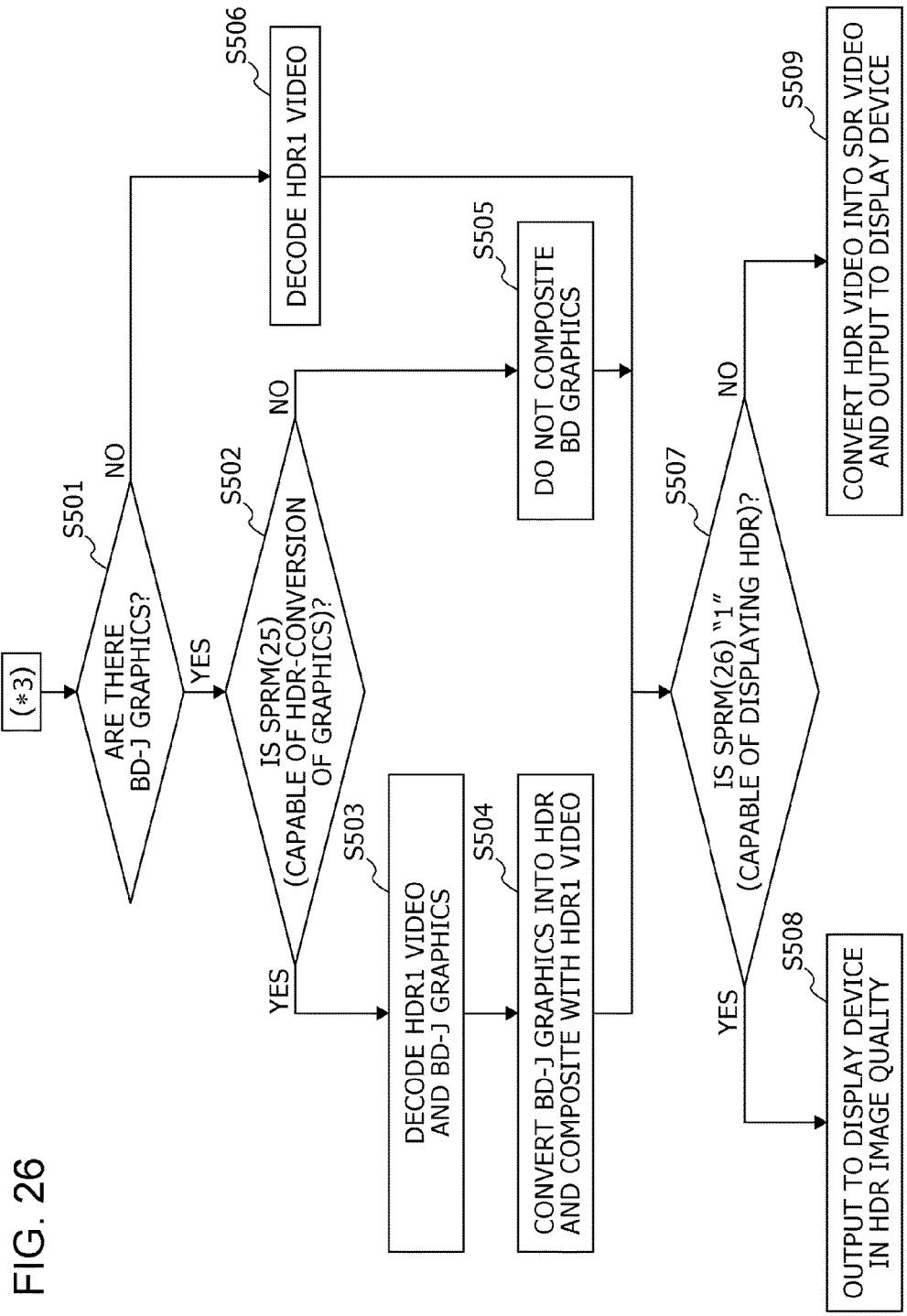
FIG. 26 is a flowchart illustrating an example of an output method of outputting video including HDR1 video to a display device, in a case where HDR1 video has been selected.

FIG. 26 is a flowchart illustrating an example of an output method in a case where HDR1 video has been selected, to output video including the HDR1 video to the display device. As illustrated in FIG. 26, in a case where HDR1 video has been selected by step S104 having been performed (*3) in FIG. 22 or FIG. 23, the playback device determines whether or not there are BD-J graphics to be displayed at the time of playing the HDR1 video (S501).

In a case where determination is made that there are BD-J graphics to be displayed when playing the HDR1 video (Yes in S501), the playback device determines whether or not the playback device has conversion capabilities of converting graphics from SDR to HDR (S502). Specifically, the playback device determines whether or not SPRM(25) is "capable of conversion of graphics into HDR".

In a case where determination is made that the playback device has conversion capabilities of converting graphics from SDR to HDR (Yes in S502), the playback device decodes the HDR1 video and BD-J graphics (S503).

The playback device converts the video of BD-J graphics obtained by the decoding into HDR image quality, and composites (superimposes) the video of the HDR1 video obtained by decoding, and the video of the BD-J graphics, obtained by converting into HDR image quality, in HDR image quality (S504).

In a case where determination is made that the playback device does not have conversion capabilities to convert graphics from SDR to HDR (No in S502), the playback device cannot composite graphics video in the HDR1 video, so just the HDR1 video is decoded (S505).

In a case of determining that there are not BD-J graphics to display when playing the HDR1 video (No in S501), the playback device decodes the HDR1 video (S506).

After step S503, after step S504, or after step S506, the playback device determines whether or not the display device is capable of HDR display (S507). Specifically, in this case, the playback device determines whether or not SPRM(26) is "1".

In a case of having determined that the display device is capable of HDR display (Yes in S505), (i) video of HDR image quality obtained by the compositing in step S503, (ii) video of the HDR1 video obtained by the decoding in step S504, or (iii) playback signals showing video of the HDR1 video obtained by the decoding in step S506, is output to the display device (S508).

In a case where determination is made that the display device is not capable of HDR display (No in S505), the playback device converts the (i) video of HDR image quality obtained by the compositing in step S503, (ii) video of the HDR1 video obtained by the decoding in step S504, or (iii) playback signals showing video of the HDR1 video obtained by the decoding in step S506, into SDR image quality video, and outputs playback signals showing video of the SDR image quality obtained by the conversion, to the display device (S509). The video of SDR image quality obtained by conversion here is HDR-incompatible SDR video. The reason is that the object is to display video on a display device that is only compatible with display of SDR. That is to say, the reason is that a display device that is only compatible with display of SDR may not be capable of displaying HDR-compatible SDR video.

Figure 27:
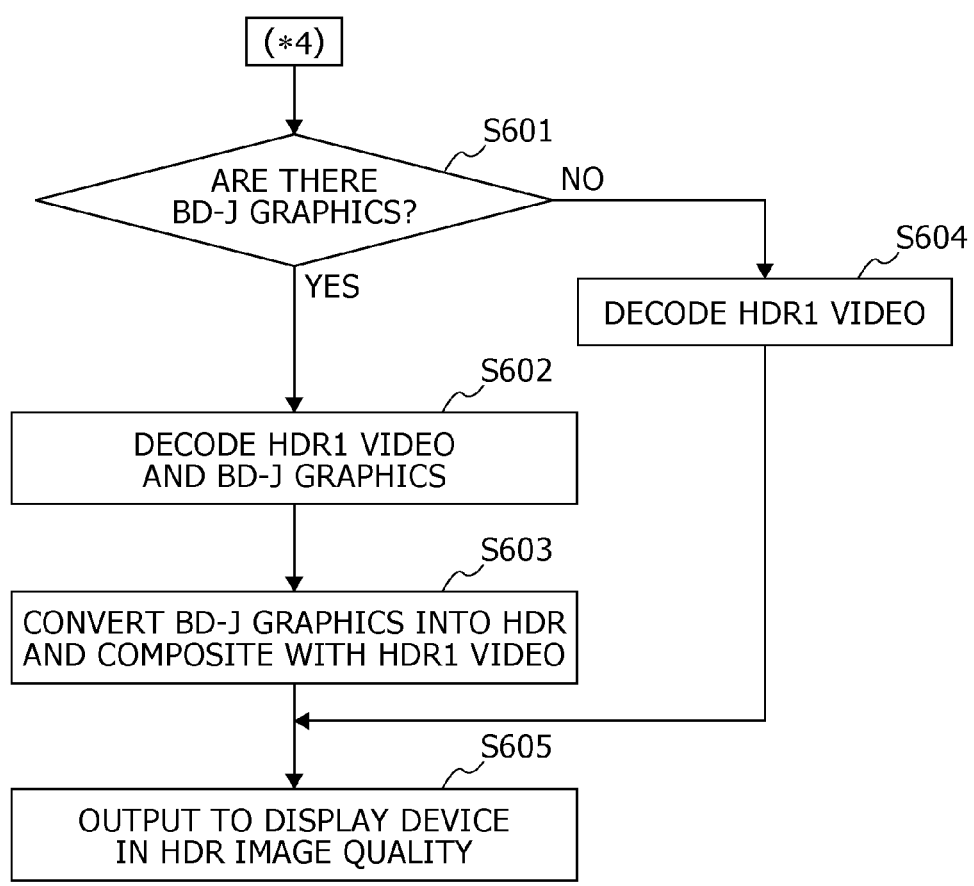
FIG. 27 is a flowchart illustrating another example of an output method of outputting video including HDR1 video to a display device, in a case where HDR1 video has been selected.

FIG. 27 is a flowchart illustrating another example of a method of outputting video including HDR1 video to a display device in a case where HDR1 video has been selected. In the output method illustrated in FIG. 27, determination is made in step S207 that the display device can display HDR video and also the graphics can be converted from SDR to HDR, so these determination results are used. As illustrated in FIG. 27, in a case where HDR1 video has been selected by step S114 having been performed (*4) in FIG. 22 or FIG. 23, the playback device determines whether or not there are BD-J graphics to be displayed at the time of playing the HDR1 video (S601).

In a case where determination is made that there are BD-J graphics to be displayed when playing the SDR1 video (Yes in S601), Yes has already been determined in the determination in S207, so the playback device decodes the HDR1 video and BD-J graphics (S602).

The playback device converts the video of BD-J graphics obtained by the decoding into HDR image quality, and composites (superimposes) the video of the HDR1 video obtained by decoding, and the video of the BD-J graphics, obtained by converting into HDR image quality, in HDR image quality (S603).

On the other hand, in a case where determination is made that there are no BD-J graphics to display at the time of playing the HDR1 video (No in S601), the playback device decodes the HDR1 video (S604).

The playback device outputs playback signals showing video of HDR image quality obtained by the compositing, or video of the HDR1 video obtained by the decoding, on the display device (S605).

Figure 28:
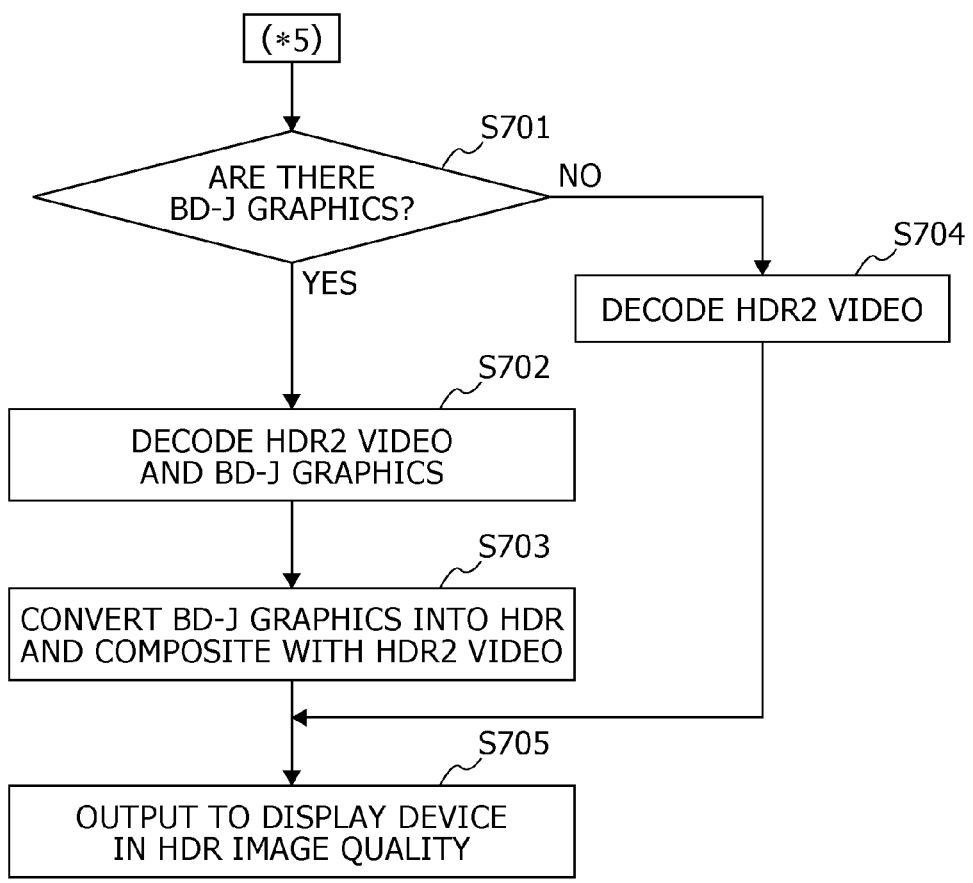
FIG. 28 is a flowchart illustrating an example of an output method of outputting video including HDR2 video to a display device, in a case where HDR2 video has been selected.

FIG. 28 is a flowchart illustrating an example of a method of outputting video including HDR2 video to a display device in a case where HDR2 video has been selected. In the output method illustrated in FIG. 28, determination has been made in step S207 that the display device can display HDR video and also the graphics can be converted from SDR to HDR, in the same way as in FIG. 27, so these determination results are used. Steps S701 through S705 in the flowchart in FIG. 28 correspond to S601 through S605 in FIG. 28 respectively, and the flowchart is the same as that in FIG. 27 if HDR1 video is replaced by HDR2 video, so description will be omitted.

FIG. 29 is a flowchart illustrating an example of a method of outputting video including HDR3 video to a display device in a case where HDR3 video has been selected. In the output method illustrated in FIG. 29, determination has been made in step S207 that the display device can display HDR video and also the graphics can be converted from SDR to HDR, in the same way as in FIG. 27 and FIG. 28, so these determination results are used. Steps S801 through S805 in the flowchart in FIG. 29 correspond to S601 through S605 in FIG. 28 respectively, and the flowchart is the same as that in FIG. 27 if HDR1 video is replaced by HDR3 video, so description will be omitted.

As described above, in order to display the video contents on a display device that cannot perform HDR display, if the playback device has capabilities of converting the dynamic range of luminance of the video from HDR to SDR, the playback device can convert the HDR video into SDR video, and the display device display the converted SDR video. Alternatively, if an SDR stream of the same video contents as the HDR stream is recorded in the recording medium, the playback device can select and play the SDR stream instead of the HDR stream, whereby the display device displays the played SDR video.

Also, in a case where the display device has HDR video display capabilities, and the playback device has playback capabilities for two different formats of HDR streams (first HDR stream and second HDR stream), if the first HDR stream and second HDR stream are recorded in the recording medium, the playback device may play the first HDR stream, or may play the second HDR stream. Note that in this case, if a higher quality image can be displayed by the display device performing display using the video of the first HDR stream, it is preferable for the playback device to select and play the first HDR stream.

In this way, the playback device selects and plays playable and displayable video streams in accordance with the playback capabilities of the playback device and display capabilities of the display device. Alternatively, if there are multiple candidates for playable and displayable video streams, the playback device selects the video content that is best for the viewer.

As described above, a playback method according to an aspect of the present embodiment is a playback method of a playback device that reads one or more video stream and identification information from a recording medium, acquires playback capability information indicating whether or not the playback device can play an HDR stream, and display capability information indicating whether or not a display device connected to the playback device can display HDR video; decides a video stream for playback out of the one or more video streams, in accordance with the identification information that has been read out, the acquired playback capability information and the acquired display capability information, plays the decided video stream, and outputs playback signals obtained by the playing on the display device.

According to this, the video stream to play is decided in accordance with the three types of information, namely, identification information, playback capability information, and display capability information, so video of an appropriate video stream can be output to the display device.

Also, in the deciding, a video stream is decided out of the one or more video streams, that can be played at the playback device and can be displayed on the display device, based on the identification information that has been read out and the acquired playback capability information and display capability information.

Also, in the deciding, in a case where there are two or more video streams that can be played at the playback device and that can be displayed at the display device, a video stream of the two or more video streams of which a predetermined priority is higher is decided to be the stream to be played. Accordingly, video of a more appropriate video stream can be output to the display device.

In a case where an HDR stream can be played and can be displayed, video of the HDR stream is output to the display device. Thus, appropriate video with higher image quality can be output to the display device.

In a case where HDR3 video that is the second HDR stream with higher priority can be played and can be displayed, video of the HDR3 video can be output to the display device. Accordingly, appropriate video with higher image quality can be output to the display device.

The above-described embodiment may also be realized as a playback device that performs the above playback method. That is to say, the playback device includes a read unit, an acquisition unit, a deciding unit, a playing unit, and an output unit. The read unit reads one or more video streams and identification information from the recording medium. The acquisition that acquires playback capability information indicating whether or not the playback device can play the HDR stream, and display capability information indicating whether or not a display device connected to the playback device can display the HDR video. The deciding unit decides a video stream for playback out of the one or more video streams, in accordance with the identification information that has been read out, the acquired playback capability information and the acquired display capability information. The playback unit plays the decided video stream. The output unit outputs playback signals obtained by the playback unit on the display device.

In the above embodiment, the components may be realized by a dedicated hardware configuration, or by executing a software program suitable for the components. The components may be realized by a program executing unit such as a CPU or processor reading out and executing a software program recorded in a recording medium such as a hard disk or semiconductor memory or the like.

Although the recording medium, playback device, and playback method according to one or multiple forms of the present disclosure has been described by way of an embodiment, the present disclosure is not restricted to this embodiment. Embodiments of various modifications conceivable by one skilled in the art, and forms configured by combining components in different embodiments, may be included in the scope of the present disclosure without departing from the essence of the present disclosure.

Note that the above description is only exemplary, and that one skilled in the art can make various applications.

The present disclosure relates to playback technology of high dynamic range video, and as described above, is useful as a playback method, playback device, and program and so forth that can decide and output an appropriate video stream out of video streams recorded on a recording medium.

What is claimed is:

1. A playback method of a playback device that plays video streams recorded in a recording medium,
in which are recorded
one or more video streams including at least one of an HDR stream of which a dynamic range of luminance of video corresponds to a high dynamic range (HDR), and an SDR stream of which a dynamic range of luminance of video corresponds to a standard dynamic range (SDR) that is narrower than HDR, and
identification information indicating whether or not the HDR stream is included in the one or more video streams,
the playback method comprising:
reading the identification information from the recording medium;
acquiring
playback capability information indicating whether or not the playback device can play the HDR stream, and
display capability information indicating whether or not a display device connected to the playback device can display the HDR video;
deciding a video stream for playback out of the one or more video streams, in accordance with the identification information that has been read out, the acquired playback capability information and the acquired display capability information;
playing the decided video stream; and
outputting playback signals obtained by the playing on the display device.

2. The playback method according to claim 1,
wherein, in the deciding, a video stream is decided out of the one or more video streams to be the stream to be played, of which the identification information that has been read out indicates being included in the one or more video streams, and the acquired playback capability information indicates that playback can be performed, and the acquired display capability information indicates that display can be performed.

3. The playback method according to claim 2,
wherein, in the deciding, in a case where there are two or more video streams that can be played at the playback device and that can be displayed at the display device, a video stream of the two or more video streams of which a predetermined priority is higher is decided to be the stream to be played.

4. The playback method according to claim 1,
wherein the identification information further indicates whether or not the SDR stream is included in the one or more video streams, and
wherein, in the deciding, in a case where the identification information indicates that the one or more video streams includes the HDR stream and the SDR stream,
if the playback capability information indicates that the HDR stream can be played, and also the display capability information indicates that the HDR stream can be displayed, the video stream corresponding to the identification information indicating being the HDR stream is decided to be the stream to be played, and
if the playback capability information indicates that the HDR stream cannot be played, or the display capability information indicates that the HDR stream cannot be displayed, the video stream corresponding to the identification information indicating being the SDR stream is decided to be the stream to be played.

5. The playback method according to claim 1,
wherein the identification information further indicates, with regard to each of the one or more video streams, whether or not a first HDR stream is included in the video streams, and whether or not a second HDR stream is included in the video streams, and
wherein, in the deciding, in a case where the identification information indicates that the one or more video streams includes the first HDR stream and the second HDR stream,
if the playback capability information indicates that the second HDR stream can be played, and also the display capability information indicates that the second HDR stream can be displayed, the video stream corresponding to the identification information indicating being the second HDR stream is decided to be the stream to be played, and
if the playback capability information indicates that the first HDR stream can be played, and also the display capability information indicates that the first HDR stream can be displayed, and the playback capability information indicates that the second HDR stream cannot be played, or the display capability information indicates that the second HDR stream cannot be displayed, the video stream corresponding to the identification information indicating being the first HDR stream is decided to be the stream to be played.

6. The playback method according to claim 5,
wherein the second HDR stream is a video stream with a higher predetermined priority than the first HDR stream.

7. A non-transitory computer-readable recording medium storing a program that causes a computer to execute the playback method according to claim 1.

8. A playback device that plays video streams recorded in a recording medium, in which are recorded
one or more video streams including at least one of an HDR stream of which a dynamic range of luminance of video corresponds to a high dynamic range (HDR), and an SDR stream of which a dynamic range of luminance of video corresponds to a standard dynamic range (SDR) that is narrower than HDR, and
identification information indicating whether or not the HDR stream is included in the one or more video streams, the playback device comprising:
a reader that reads the identification information from the recording medium;
an acquirer that acquires
playback capability information indicating whether or not the playback device can play the HDR stream, and
display capability information indicating whether or not a display device connected to the playback device can display the HDR video;
a decider that decides a video stream for playback out of the one or more video streams, in accordance with the identification information that has been read out, and the acquired playback capability information and the acquired display capability information;
a player that plays the decided video stream; and
an outputter that outputs playback signals obtained by the player on the display device.

\* \* \* \* \*